United States Patent [19]

Richards et al.

[11] 4,017,689
[45] Apr. 12, 1977

[54] DIGIT ANALYSIS SYSTEM FOR PRIVATE AUTOMATIC BRANCH EXCHANGE TELEPHONE SYSTEM

[75] Inventors: Glenn L. Richards, Caledonia; Uwe A. Pommerening, Webster, both of N.Y.

[73] Assignee: Stromberg-Carlson Corporation, Rochester, N.Y.

[22] Filed: Mar. 25, 1975

[21] Appl. No.: 561,796

[52] U.S. Cl. .................. 179/18 EB; 179/18 AD
[51] Int. Cl.² ........................................ H04M 3/22
[58] Field of Search .... 179/27 CA, 18 AD, 18 DA, 179/18 HA, 18 D, 18 EB, 7 MM

[56] References Cited

UNITED STATES PATENTS

| | | | |
|---|---|---|---|
| 3,671,677 | 6/1972 | Lee, Jr. et al. | 179/18 DA |
| 3,736,383 | 5/1973 | LeBaron | 179/18 HA |
| 3,748,396 | 7/1973 | Hestad et al. | 179/18 DA |
| 3,784,757 | 1/1974 | Woolf et al. | 179/18 DA |
| 3,821,485 | 6/1974 | Harrington et al. | 179/18 DA |
| 3,851,109 | 11/1974 | Downs et al. | 179/18 DA |

*Primary Examiner*—Thomas W. Brown
*Attorney, Agent, or Firm*—Donald R. Antonelli; William F. Porter, Jr.

[57] ABSTRACT

Digit analysis within an electronic private automatic branch exchange telephone system is carried out through interconnected sections of digit decoder circuitry. A first portion of the digit decoder effectively processes dialed impulses originating within the PBX system and determines whether or not the call is to be directed to another line within the system, to a trunk or to the attendant. The contents of an ING and ED memory are continuously monitored and modified, where necessary on a time shared basis with the other calls processed by the system. Direct inward dialing and listed directory number analysis is carried out in a second portion of the decoder which also causes the ING and ED memory to be monitored and modified, where necessary for the processing of the digits. For either internally directed or externally directed calls, the sequentially received digits are initially processed in the units position of the memory and appropriate action is taken as the result thereof. BCD bit values greater than 10 are selectively stored in the tens position of the ED memory for processing of both DID calls and toll restriction analysis.

7 Claims, 13 Drawing Figures

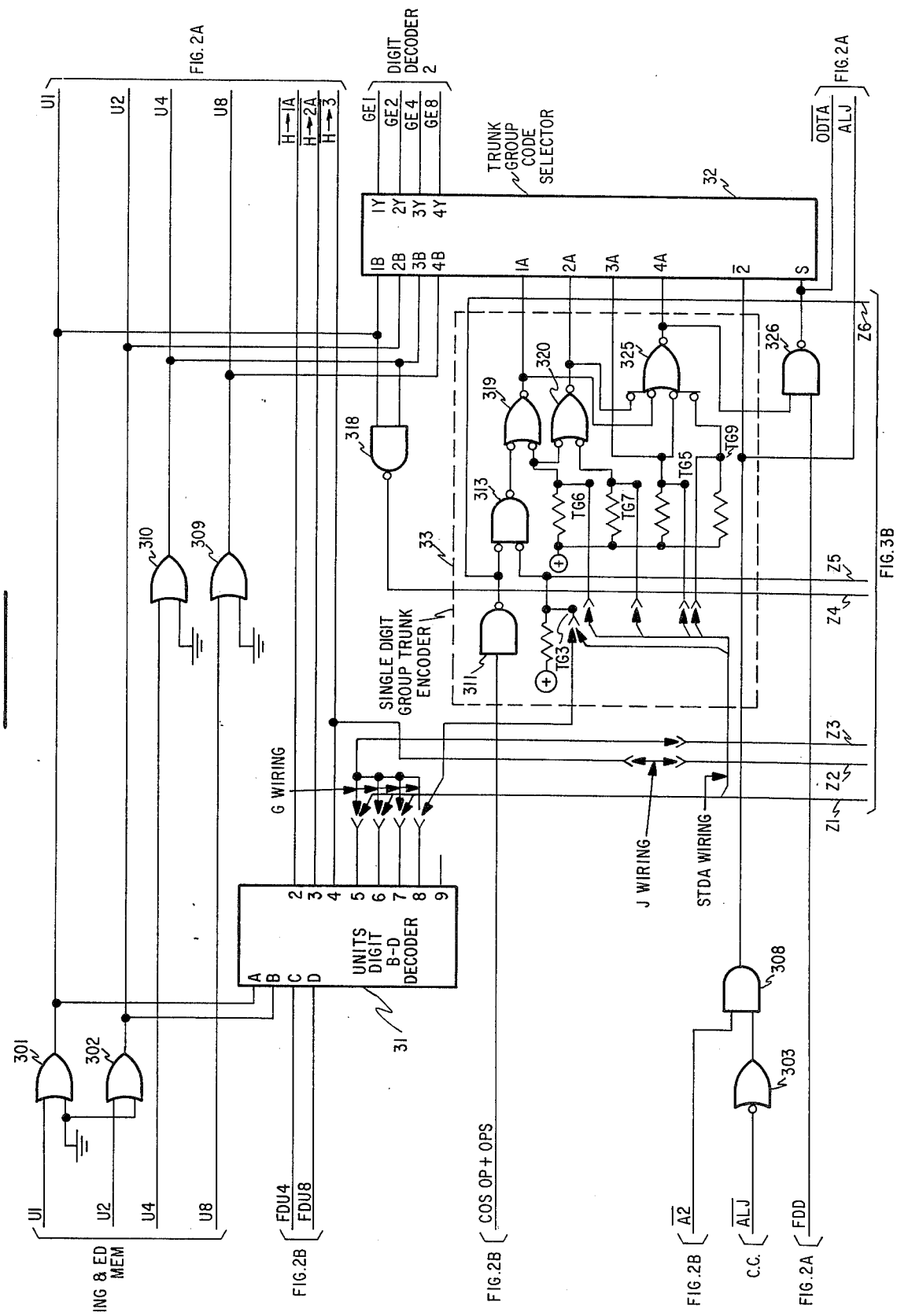

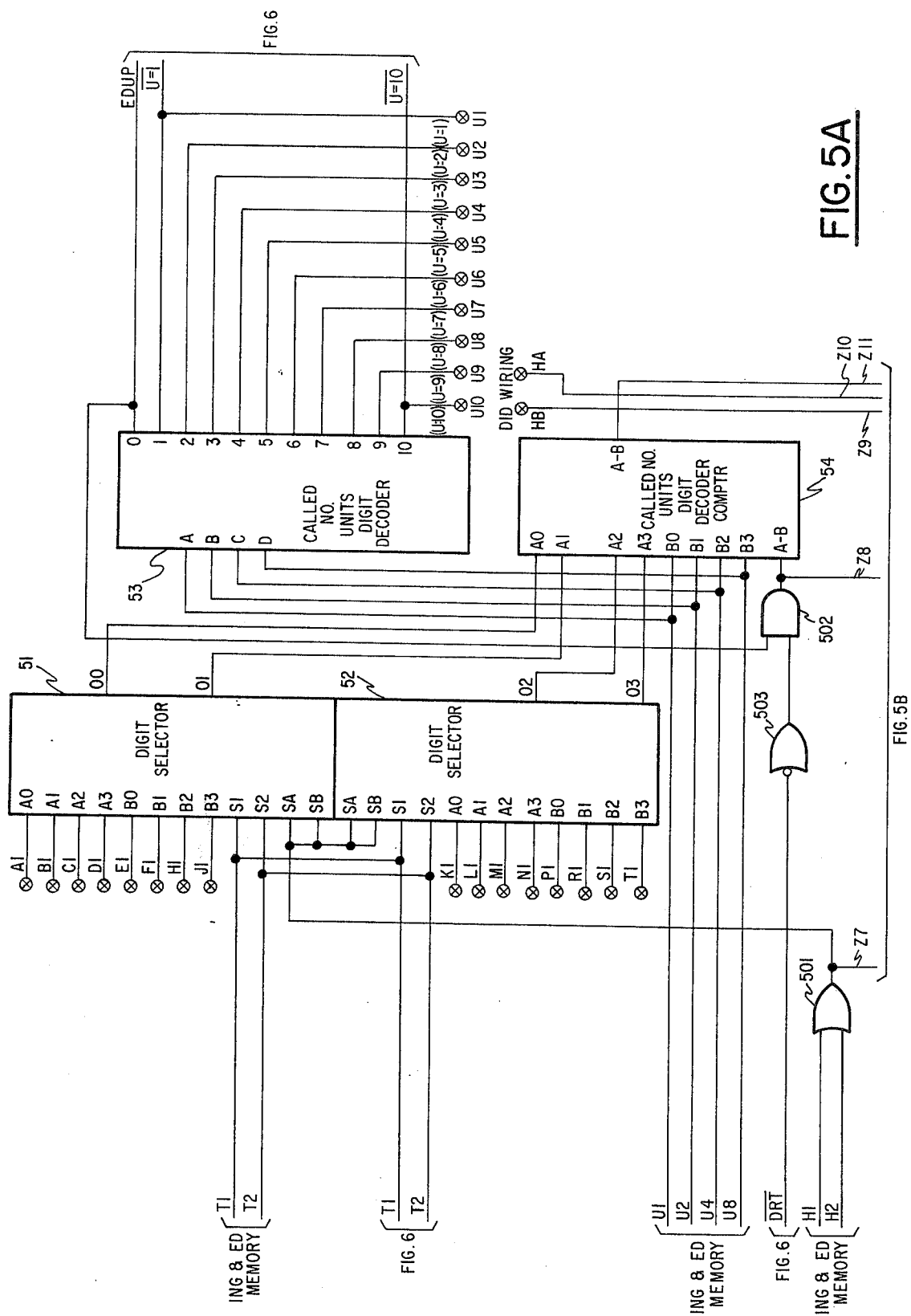

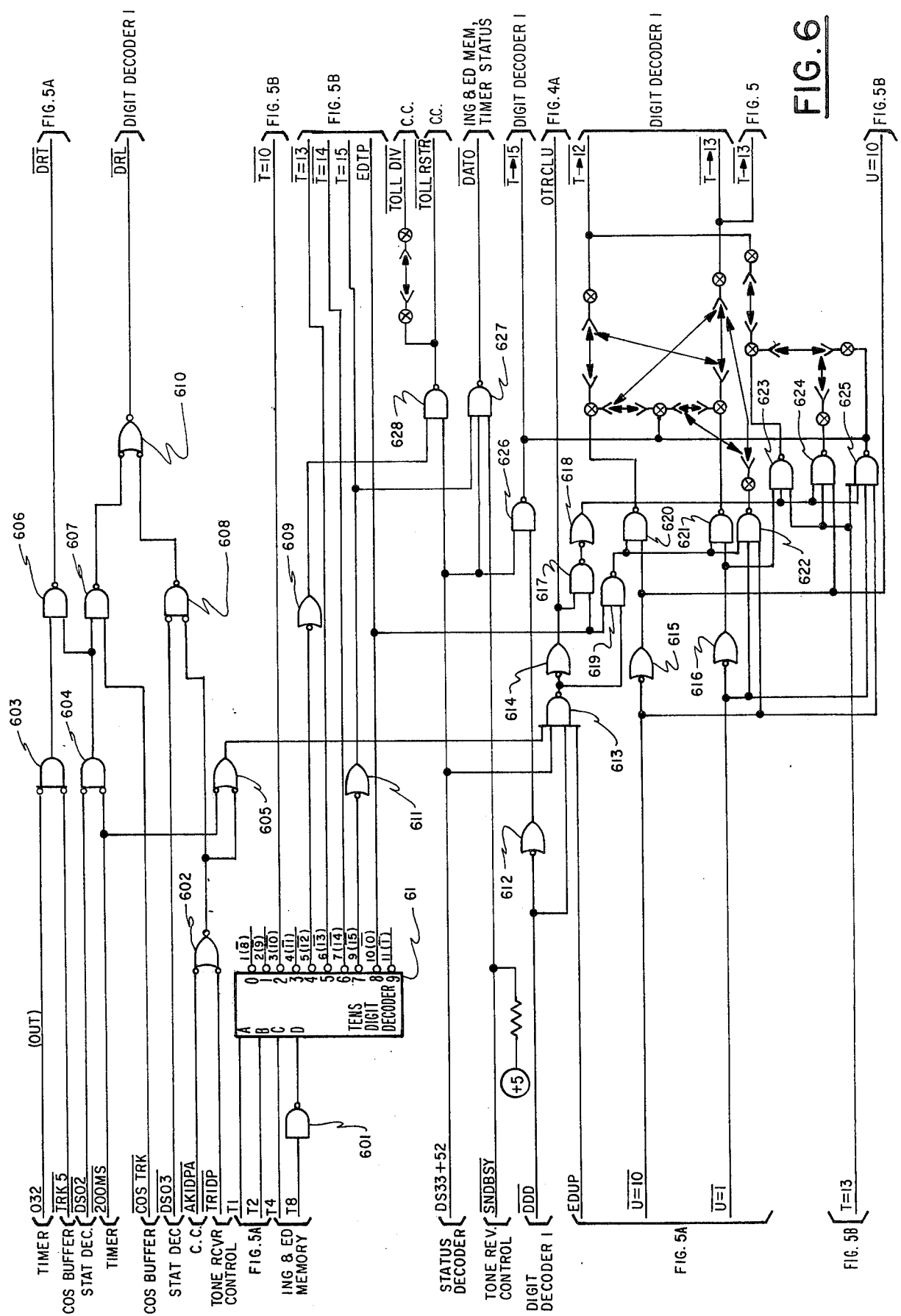

DIGIT ANALYSIS SYSTEM FOR PRIVATE AUTOMATIC BRANCH EXCHANGE TELEPHONE SYSTEM

FIELD OF THE INVENTION

The present invention relates in general to telephone systems, and, more particularly, to a digit decoder arrangement for an electronic private automatic branch exchange telephone system, wherein dialed digit impulses are detected and processed for establishing a connection between a calling and a called party.

BACKGROUND OF THE INVENTION

In a conventional manner of analyzing dialed digits plural groups of relays are provided, each group being associated with a specified digit position, such as the unit position, tens position, hundreds position, etc. and binary divider chains, coupled to the relay groups, are employed for analyzing the dialed digits. Moreover, separate counters, associated with the relay-divider groups are employed for counting the received digits. Unfortunately, with this type of arrangement, a considerable amount of counting and storage circuitry is necessary for carrying out the analysis of the dialed digits for processing by the system.

In our copending application entitled Electronic Private Automatic Branch Exchange application Ser. No. 431,928, filed Jan. 9, 1974, now U.S. Pat. No. 3,943,297, there is described a new and improved electronic private automatic branch exchange telephone system wherein calls are handled on a time shared basis. In this system, in place of the usual switching matrix, which is associated with the common control for both switching and talking functions, the switching matrix transmits only the talking signals between the parties. The common control components are associated with each call continuously throughout the call and the status of each calling and called party is continuously monitored and processed on a time shared basis. In this system, an ING and ED memory is employed to store information relative to the called and calling numbers. Status circuitry, which forms a part of the general common control, provides appropriate signals representative of the status of each call during a prescribed time slot associated with the junctor which has been selected to handle the call connection. Depending upon both the present status of the call and information signals relative to any changes in the call as the call progresses, such as a change from on-hook condition to off-hook and dial tone, dialing, busy testing, ringing, etc., the common control supplies signals to and receives signals from the various components used for establishing and maintaining a call connection during each time slot associated with the junctors which are used for the call connection.

When a calling party desires a connection with another called number, the ING and ED memory is employed to store the numerical identification of the calling and called parties so that appropriate action may be taken by the common control during the establishment of the call. The common control acts upon the contents of the ING and ED memory at the appropriate junctor time slot assigned for that particular call. Of course, one of the basic operations which must be carried out in the establishment of a call is the identification of the called number and the processing of the dialed information.

The present invention relates particularly to an arrangement for analyzing and decoding dialed information so that the call may be properly established under the control of the common control and the associated circuit components coupled therewith. The present invention is particularly useful in a time shared PBX system and may be employed in the system described in our above referred to application entitled Electronic Private Automatic Branch Exchange.

BRIEF DESCRIPTION OF THE INVENTION

In accordance with the present invention, analysis of the dialed digits is carried out within the common control portion of the system. Dialed digit impulses and interdigital pauses are detected by timer circuitry, to effect a proper identification that the impulses are dialed impulses and represent the dialed information of a called party. Status circuitry within the common control governs under what conditions the dialed impulses will be acted upon. Of course, in addition to dialed digit impulses, keyed information, from tone dial equipment or from the attendant's turret may be supplied to the decoding circuitry. The decoder steers the digit information, whether it be impulse or keyed information, into the proper storage positions of the ING and ED memory.

The analysis of the digits will occur as local stations or the attendant initiate local calls, access trunk groups, and outpulse. Digit analysis takes place for inward dialed trunk calls. Basically, the digit analysis or decoding involves the assembly of dialed impulse streams into stored digits and the decoding of the digits to determine what action is required by the system. The output of the digit decoder of the present invention consists of data codes to be stored and instruction signals to be delivered to the common control for processing of the call.

In accordance with the present invention, the digit decoder may be broken down into two component parts. A first part, hereinafter referred to as digit decoder 1, receives the dialed impulses and cycles these impulses to and from the ED memory until a complete digit has been received. As each digit is dialed or keyed, the decoder acts upon the dialed digit and sends the necessary signals to the common control for processing the call. Once a complete set of dialed digits has been received identifying the proper called party, the decoder analyses the information and again instructs the common control what is to be done with the information, so that further processing of the call can take place.

The decoder also permits a direct inward dialed call to be processed. The dialed number is compared with a listed directory number and when a proper comparison between the numbers has been recognized, the call is rapidly processed as though a normal dialed number.

The present invention also provides for outward toll analysis and when the calling party has dialed a trunk access code, the call may be blocked or permitted to be processed, depending upon the class of service associated with the calling number and appropriate strapping within the digit decoder. Strapping within the system will permits calls to be intercepted to a recorder or supplied with busy tone, where desired.

For a better and detailed understanding of the present invention, attention is directed to the drawings accompanying the present specification and the detailed description thereof to follow.

BRIEF DESCRIPTION OF THE DRAWINGS

FIGS. 2A, 2B and 3A, 3B are detailed schematic circuit diagrams of the digit decoder 1 portion of the present invention;

FIGS. 4A, 4B, 5A, 5B and 6 are detailed circuit diagrams of the digit decoder 2 portion of the present invention;

DETAILED DESCRIPTION

Figure 1:
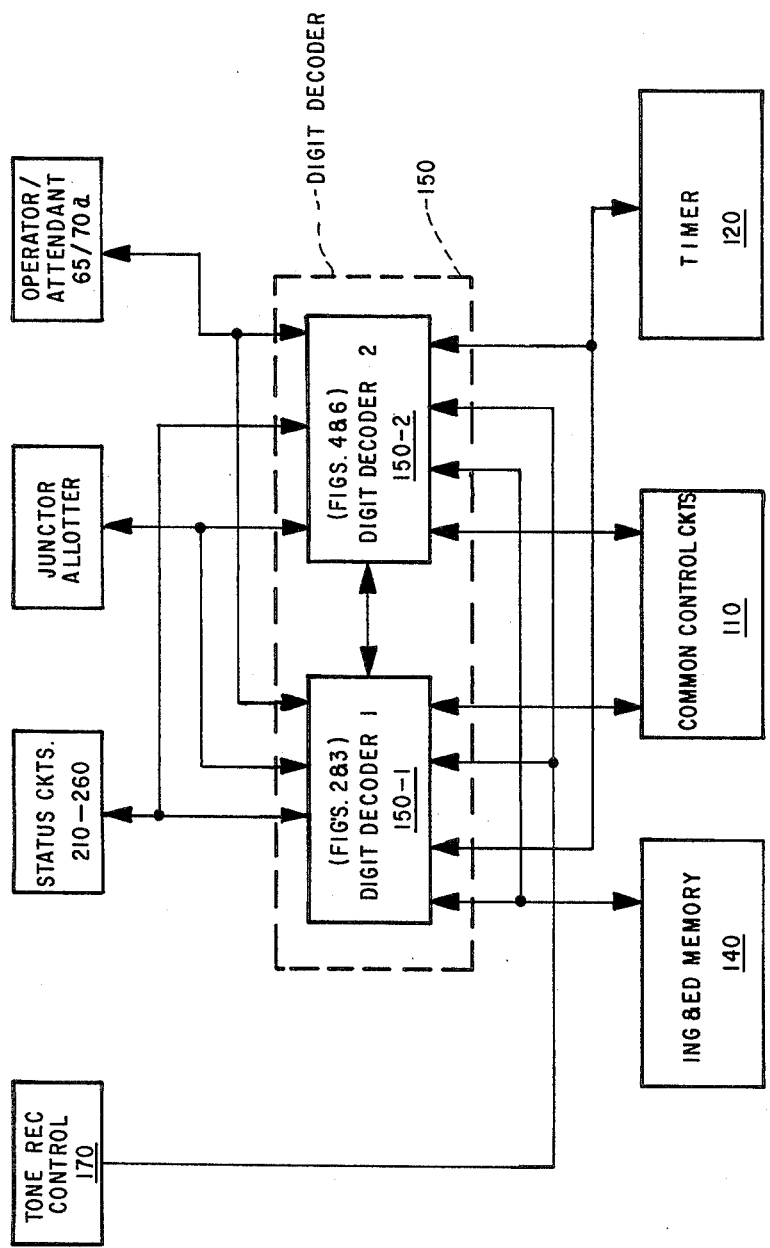
FIG. 1 is a block diagram of the digit decoder of the present invention and its association with the common control.

As was mentioned previously, the present invention is adapted to be used for time-shared digit data and is particularly useful in our above-referred to application entitled Electronic Private Automatic Branch Exchange. For the purpose of correlating the description to follow with the above referred to system, in order to simplify the description, reference numerals for basic components of the common control employed for digit analysis in the above-referred to system will be used in the drawings of the present application. Specifically, FIG. 1 illustrates those portions of FIGS. 1a and 1b of the above referred to application, the digit decoder being identified as digit decoder 150. As was mentioned previously, the digit decoder itself may be considered to be split into first and second portions, identified as digit decoder 1, block 150-1 and digit decoder 2, block 150-2, as shown in FIG. 1. Coupled to the digit decoder 150 is the operator/attendant 65/70a and tone receiver control circuitry 170 for supplying keyed information representative of digits identifying a called number. Information digits representative of the identity of the calling and called numbers are stored in the ING and ED memory 140 and the status of the call is supplied by the status circuits. A timer 120 analyzes the impulses as they are dialed and provides signals, to be discussed hereinafter in detail, when the digit impulses are true impulses representative of called digits. Junctor allotter circuitry and the common control circuits 110 are also associated with the decoder for supplying thereto and receiving therefrom appropriate control signals for each time shared call as the digits are received and processed.

Figure 2A:
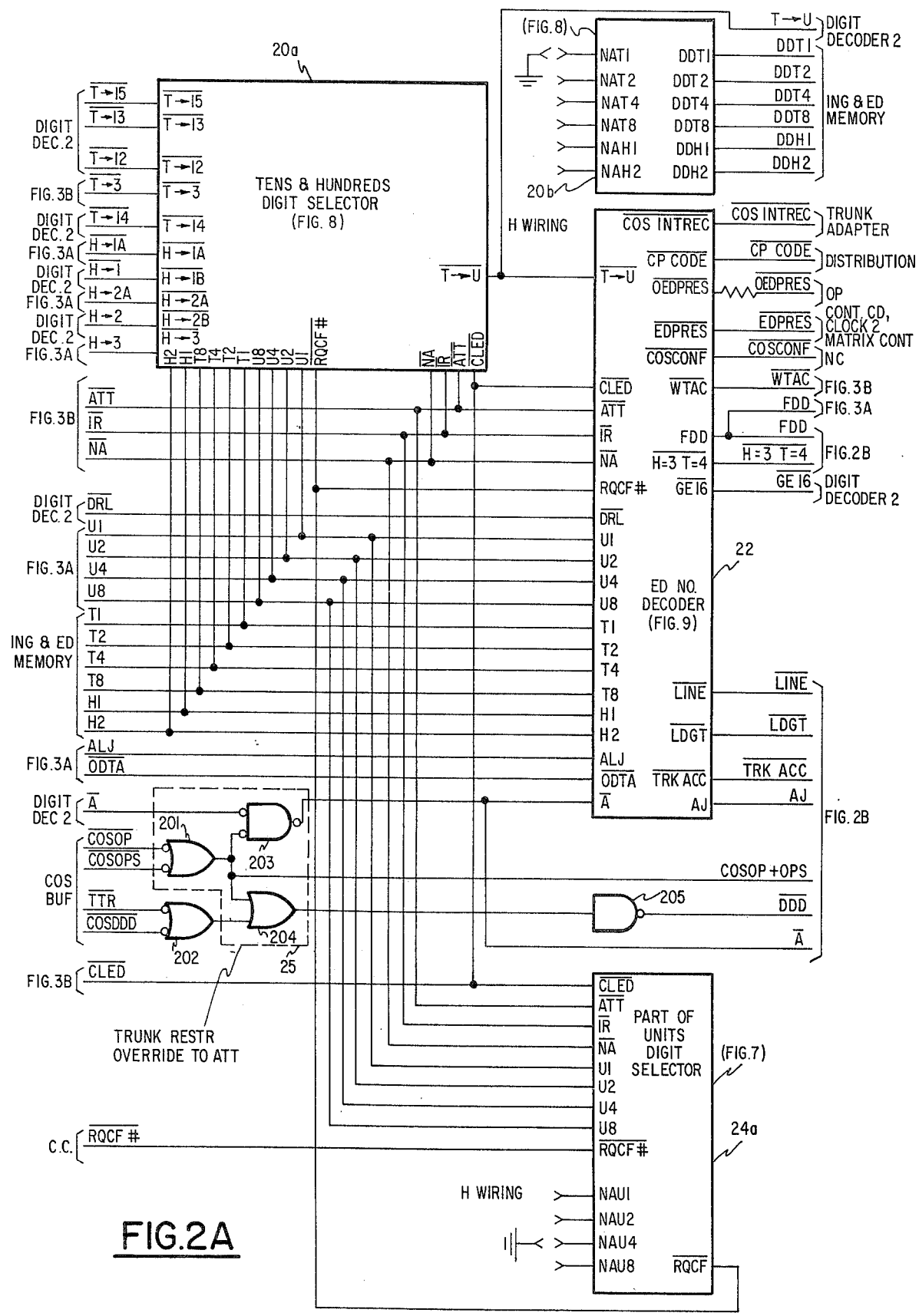
Figure 2B:
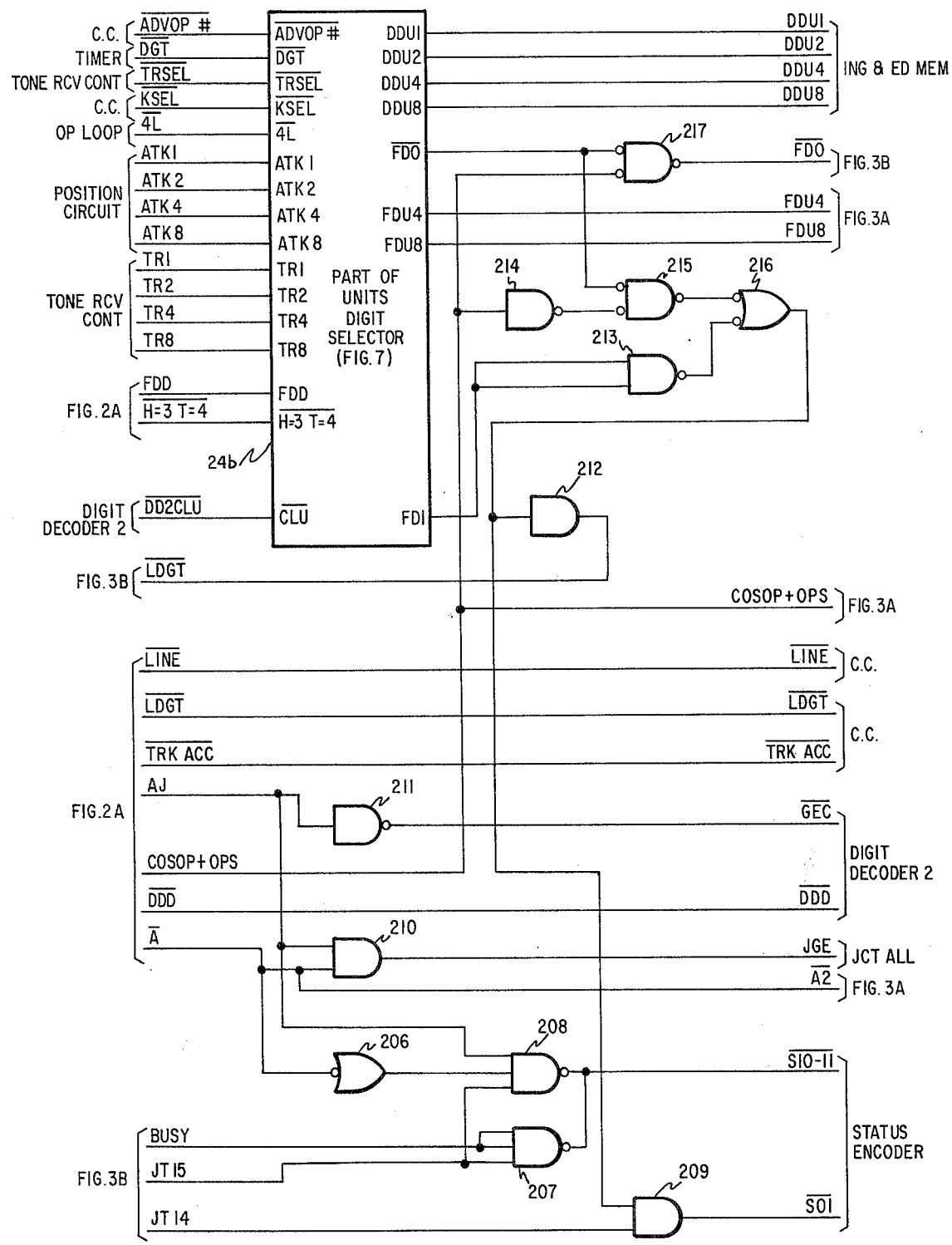
Figure 7:
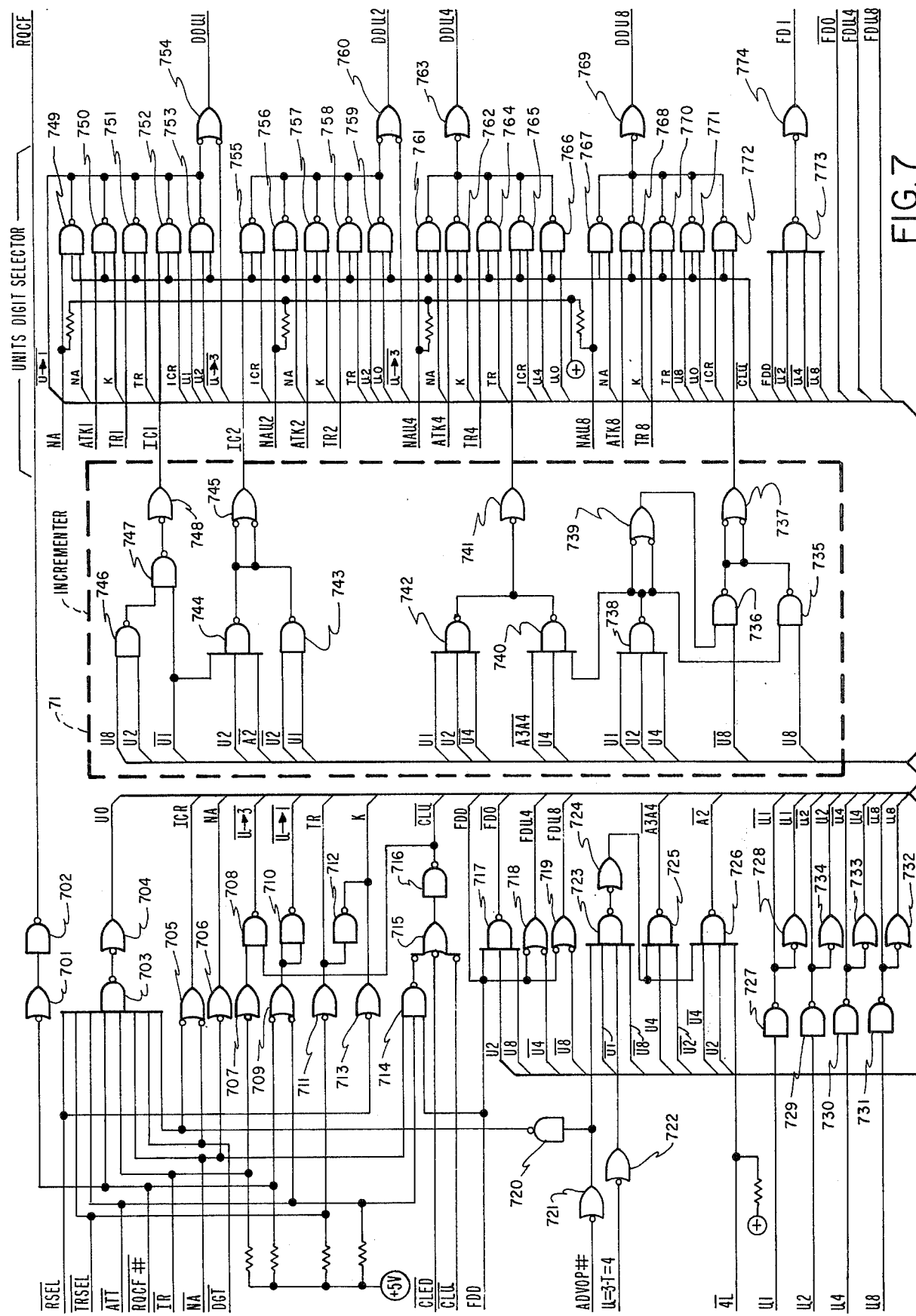
FIG. 7 is a logic circuit diagram of the unit digit selector for the digit decoder 1 portion of the present invention.
Figure 8:
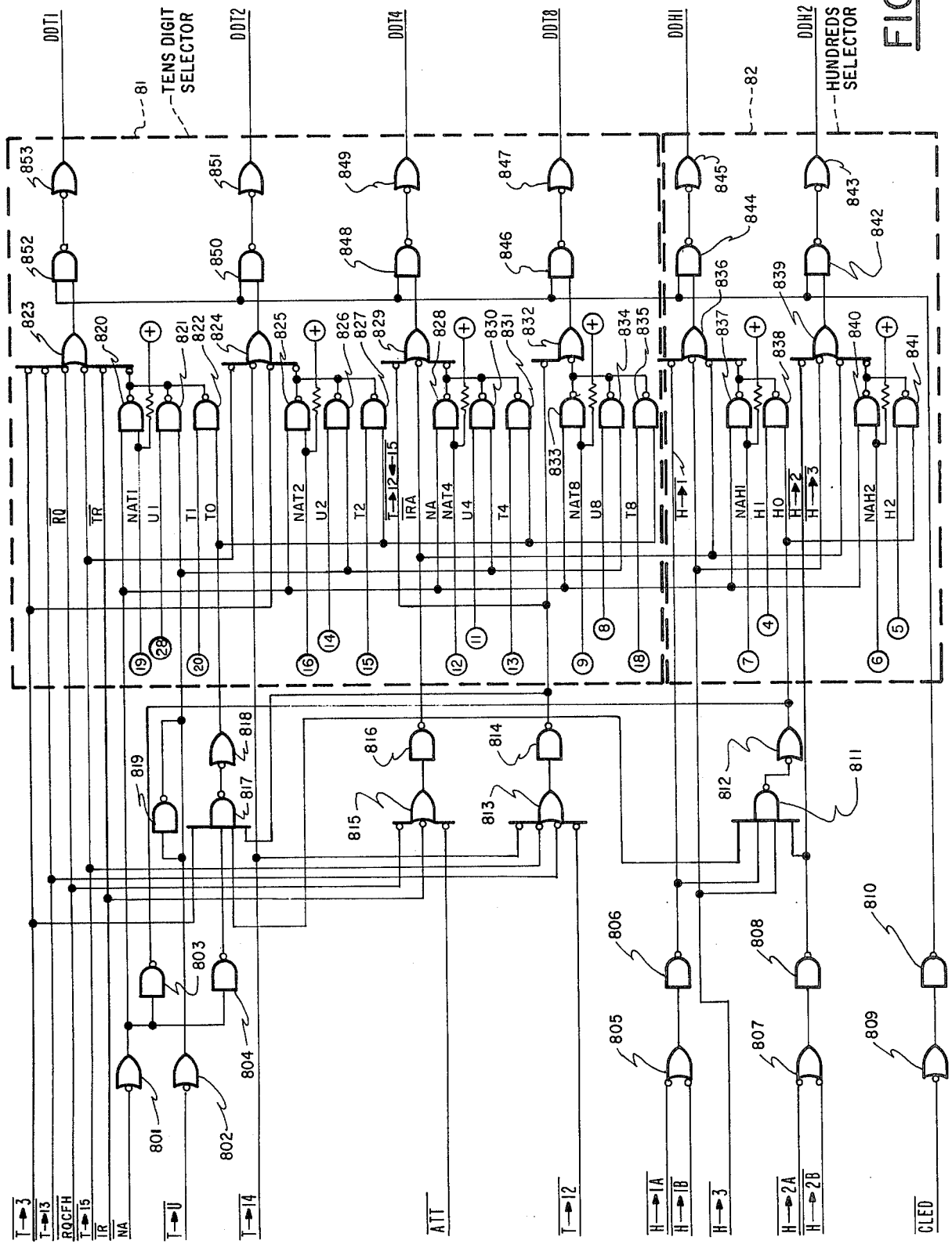
FIG. 8 is a logic circuit diagram of the tens and hundreds selector portion of the digit decoder 1 portion of the present invention.
Figure 9:
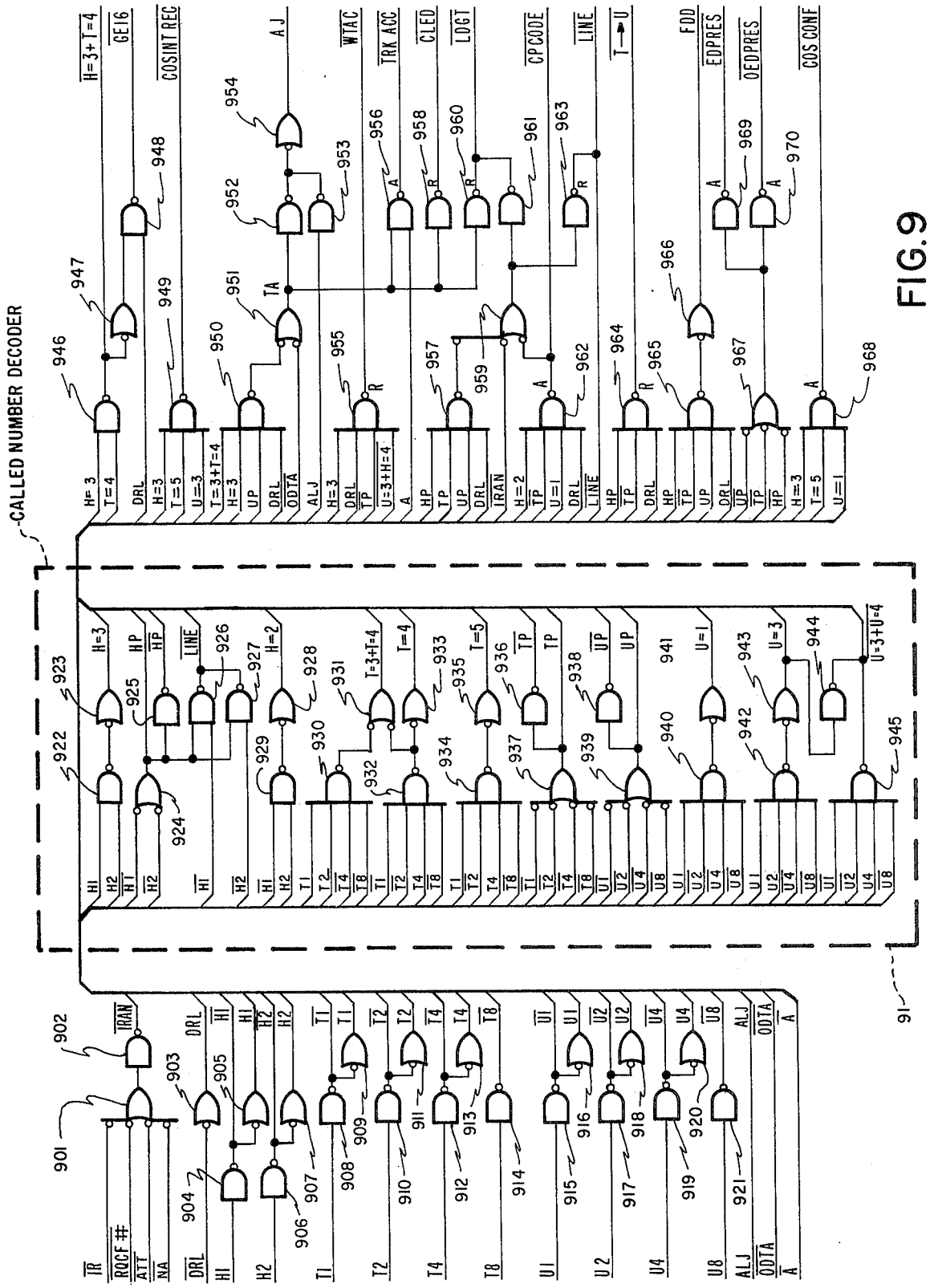
FIG. 9 is a detailed logic diagram of the called number decoder employed in the digit decoder 1 portion of the present invention.

The circuitry for carrying out the basis analysis of the received digits is depicted in FIGS. 2A and 2B which shows a portion of the digit decoder 1. In FIGS. 2A and 2B there are illustrated a tens and hundreds digit selector 20a and 20b, the details of which are illustrated in FIG. 8, a units digit selector 24a and 24b, the details of which are illustrated in FIG. 7, and a called number decoder 22, the details of which are illustrated in FIG. 9. These selectors and decoders receive the bits from the ING and ED memory storage locations, analyze the information and update the same in accordance with proper steering signals and then return the bits to their appropriate locations in the ING and ED memory. Each of the dialed numbers is coded in binary coded decimal format, so that for each digit position there will be up to about four bits. For the units position, there are four bits identified by U1-U8; for the tens position there are four bits identified by T1-T8, and for the hundreds position there are two bits identified by the bits H1 and H2.

Figure 3B:
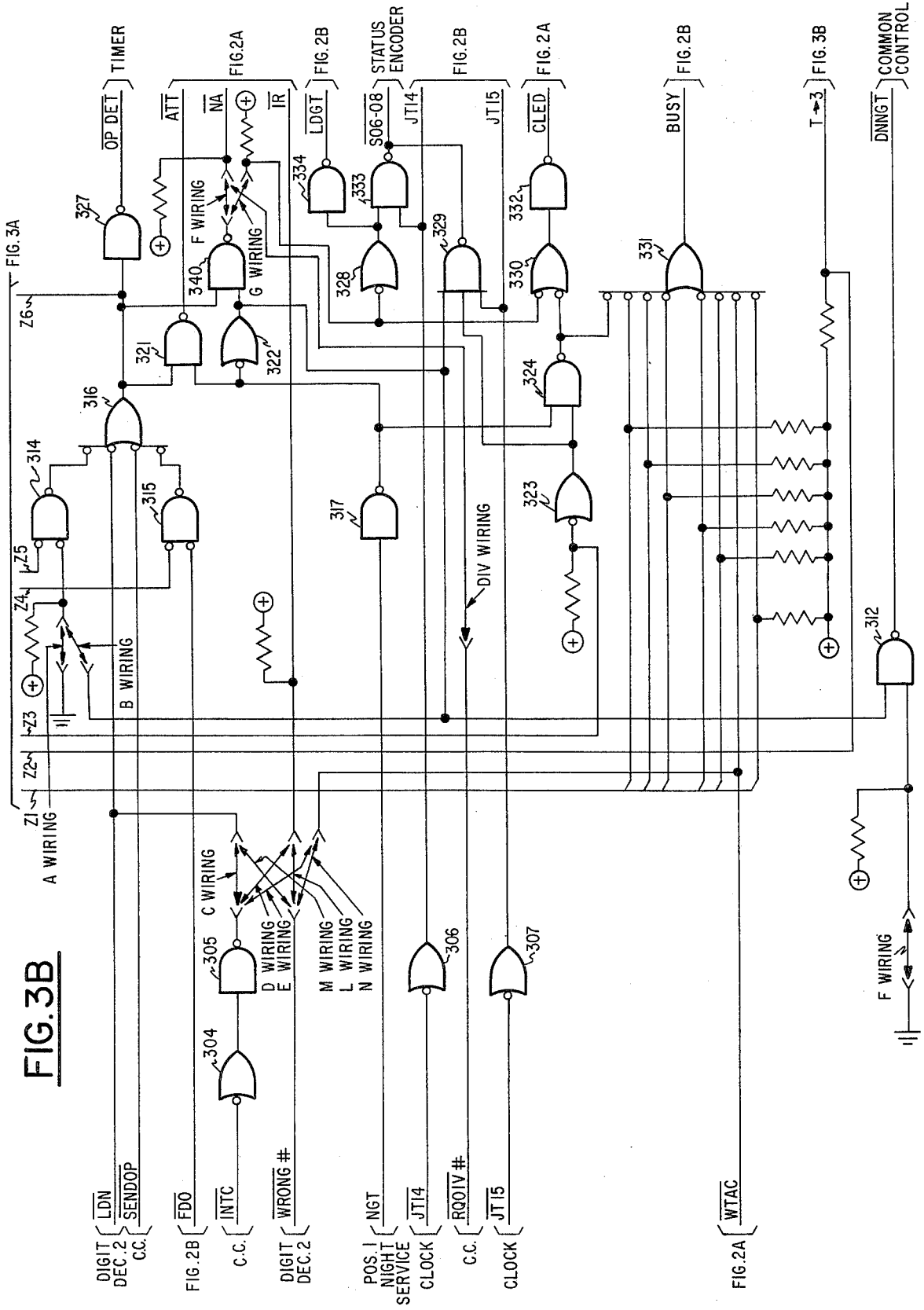

The encoder and steering logic circuitry shown in FIGS. 3A and 3B, which is part of the digit decoder 1, carries out appropriate decoding and encoding functions of the data received from the ING and ED memory and processed in both the first and second portions of the decoder.

Figure 4A:
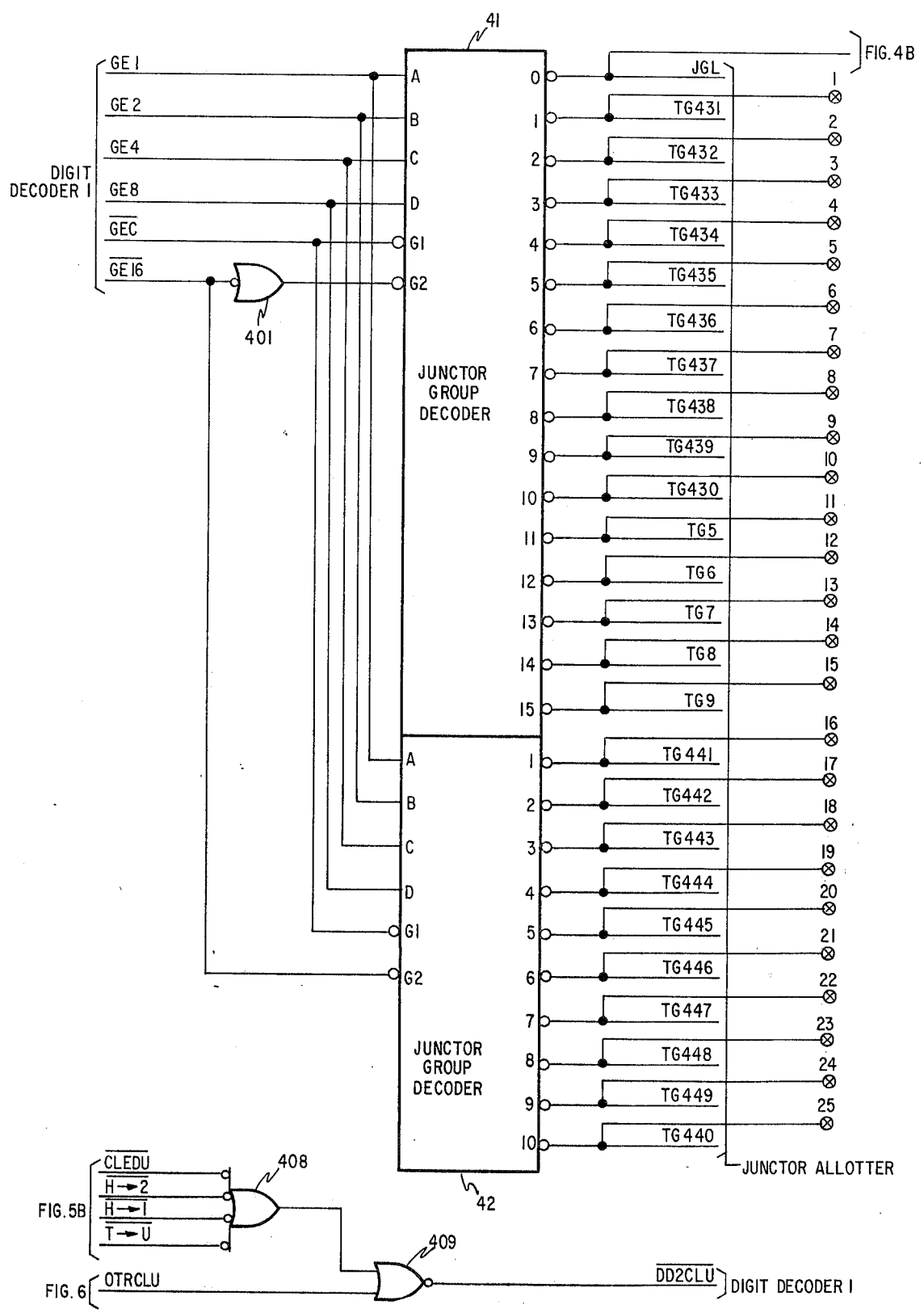
Figure 4B:
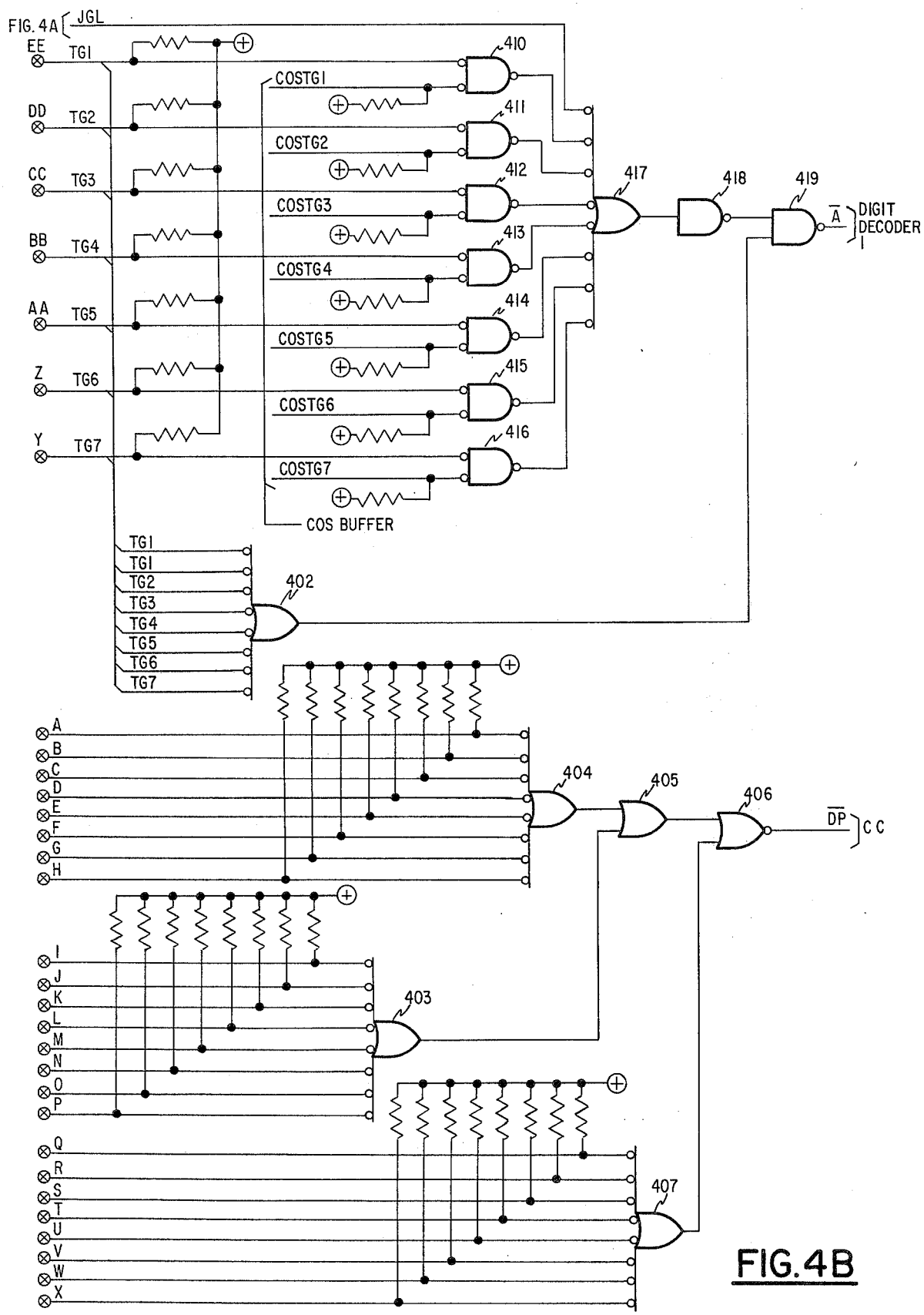
Figure 5B:
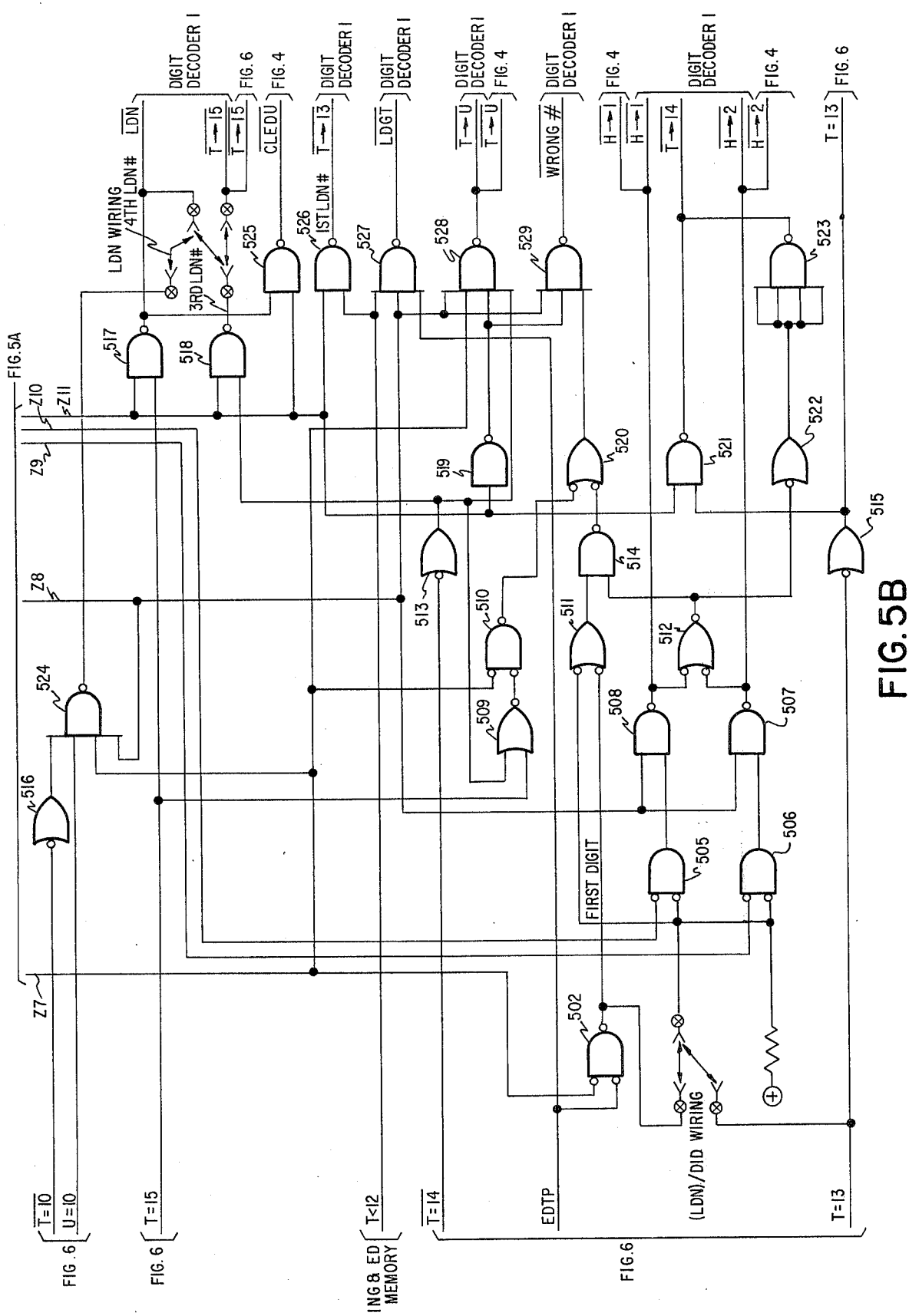

FIGS. 4A and 4B shows trunk group decoder and strapping fields to associate trunk groups with calling line trunk group access restriction classes of service and to instruct the system that out pulsing to the trunk must be dial pulsing only. FIGS. 5A and 5B show the portion of the digit decoder -2 for carrying out listed directory number and direct inward dialed digit analysis, while the logic circuitry of FIG. 6 carries out outward toll restriction analysis. These various functions are inter-related with one another, depending upon the dialed information, so that the following description will refer to the various figures in accordance with the analysis being effected for the particular digits dialed.

For a clear understanding of the operation of the circuits shown in FIGS. 2A-9, attention is directed to Table I, set forth below, which tabulates the assignment of each particular digit dialed as the first digit.

Table I

| Digit | Assignment |
| --- | --- |
| 1 | absorbed repeatedly |
| 2 | station numbers 2XX (100 lines) |
| 3 | station numbers 32X and 33X (20 lines) and dial call pick-up code "31" |
| 4 | two-or three-digit trunk-access codes or intercept to busy tones; 4X or 43X and 44X |
| 5 | single-digit trunk-access code, universal night answer (UNA) code, or intercept to busy tone |
| 6 | single-digit trunk-access code, UNA code, or intercept to busy tone |
| 7 | single-digit trunk-access code, UNA code, code-call access code, or intercept to busy tone |
| 8 | single-digit trunk-access code, UNA code, intercept to attendant or intercept to busy tone |
| 9 | single-digit trunk-access code, or intercept to busy tone |
| 0 | attendant |

As can be seen from the digit assignment for the first digit, shown in the above Table I, there are 120 station numbers associated with the PBX. It is to be observed that the digit assignment listed in Table I identifies the effect which the first digit dialed has on the system. It is by virtue of this first digit that the system proceeds to carry out whatever functions are associated with the dialed number. For a better understanding of what takes place and the operation of the circuits shown in FIGS. 2A-9, the following description will relate the circuitry to specific call conditions as represented by specific dialed digits.

As is described in detail in our above referred to copending application, a call is initiated when a calling subscriber goes from an on-hook condition (status 0) to an off-hook condition (status 1). The calling subscriber receives dial tone and then proceeds to dial or key digit information. When this happens, the status circuitry within the common control provides an output signal indicative of the call status at that moment. If, from an initial off-hook condition, the subscriber is equipped with digit pulse dialing equipment, when the subscriber receives dial tone and begins to dial, the status of the call shifts from status 1 to status 2 and this condition is indicated by the status circuit by way of signal $\overline{DSO2}$ which is supplied as one input to the gate 604, shown in FIG. 6.

DIALED DIGIT DETECTION

During the dialing of the digits themselves, the calling bridge relay provides a series of pulses as the bridge relay goes on-hook and off-hook. For each generated pulse, the timer circuit provides a digit pulse signal $\overline{DGT}$ as one of the inputs to the units digit selector 24b depicted in the circuit diagram of FIG. 2B and shown in detail in FIG. 7. The units digit selector 24a also receives from the ING and ED memory the respective binary coded decimal bits U1, U2, U4 and U8. For an original on-hook condition, that portion of the ING and ED memory corresponding to the particular time slot being operated on by the system will be cleared so that before any pulse is received corresponding to a dialed pulse, the inputs U1–U8 from the ING and ED memory will be zero. As each digit pulse is received, the incrementor circuit 71, shown in FIG. 7, which receives the outputs of gates 725–734, will increment the number by 1 and supply the same over the output leads DDU1–DDU8 from gates 754, 760, 763 and 769, respectively. These output leads are connected to the ING and ED memory, as shown in FIG. 2B, to supply the incremented units digits back into storage in the memory. Thus, for each digit pulse from the timer, the contents of the ING and ED memory are incremented.

Now, when the pause between pulses reaches 200 milliseconds, corresponding to the end of a series of pulses representing a single digit, the timer circuit will provide an input over line $\overline{200\ MS}$ shown in FIG. 6, to the other input of gate 604. The output of gate 604 is coupled to gate 607 and to gate 606. The other input to gate 607 is delivered from the class of service buffer in the common control. Assuming that the class of service is not that of a trunk, gate 607 will supply an output to gate 610 which is coupled over line $\overline{DRL}$ to the called number decoder 22 within the digit decoder 1, shown in FIG. 2A. The receipt of the signal $\overline{DRL}$, as described above, indicates to the system that one complete digit has been received. This $\overline{DRL}$ signal instructs the digit decoder to act upon the data stored in the ED portion of the ING and ED memory.

In lieu of consecutively produced digit pulses, the subscriber circuit may be equipped with tone dial equipment. If such is the case, the status circuit will provide a signal over line $\overline{DSO3}$ as one input to gate 608 indicating that the status of the call has shifted from an off-hook condition to tone dialing. Tone dial signals are supplied over the inputs $\overline{AKIDPA}$ indicative of the detection of an interdigital pause from the attendant's keyset, and $\overline{TRIDP}$ indicative of the detection of an interdigital pause from the tone receiver control and the common control through gate 602 as the other input of gate 608, which also feeds OR gate 610. As a result, gate 610 will supply the signal $\overline{DRL}$ when either a complete series of dialed impulses representative of a digit or a dial tone key indication from a hand-set or the attendant's key set provides an indication that a complete digit has been supplied to the decoder.

In the units digits selector, shown in detail in FIG. 7, where tone dial equipment is employed, inputs are supplied over lines $\overline{TRSEL}$ from the tone receiver control and $\overline{KSEL}$ from the common control to gates 703 and 704 which supply an output over line U0. Gates 703 and 704 are for the purpose of permitting the units digit to be coupled to the output of the units digits selector unless the digit is to be changed. For an initial cleared condition, when tone dial equipment is employed so that the digit is to be changed, the inputs TR1, TR2, TR4 and TR8 from the tone receiver control are coupled to gates 751, 758, 764, and 770, respectively, so that the outputs DDU1–DDU8 will indicate the appropriate binary coded decimal information to be supplied to the ING and ED memory for the tone-keyed digit. Similarly, where the attendant depresses tone dial equipment on the attendant's turret, inputs will be supplied over lines ATK1–ATK8 to gates 750, 756, 762 and 768, respectively, as shown in FIG. 7, to set the appropriate values over the output lines DDU1–DDU8.

Now having described the manner in which digits, represented either by dialed impulses or keyed-tones are supplied to the decoder, the following description will relate to the manner in which the decoder detects and identifies the first dialed digit and proceeds to operate on the basis of the information contained therein.

FIRST DIGIT DETECTION

With the ED memory being cleared, when the first digit is dialed and before any digit impulses or tone-keyed information is received by the decoder, the ING and ED memory is applying zeroes on all the inputs U1–U8 for the units position, T1–T8 for the tens position and H1–H2 for the hundreds position. Thus, each of the inputs U1–H2 to the called number decoder 22, shown in FIG. 2A, will be zeroes. The units digits U1–U8 are supplied through OR gates 301, 302, 310 and 309, respectively, for interfacing to the called number decoder 22, shown in FIG. 2A.

Within the called number decoder, the details of which are shown in FIG. 9, the initial contents of the called number stored within the ING and ED memory are coupled to gates 904–921. These gates supply both normal and inverted outputs U1, $\overline{U1}$, U2, $\overline{U2}$ ... H2, $\overline{H2}$, which are, in turn, coupled to the inputs of gates 922–945 within the called number decoder 91. The called number decoder 91 is, as can be seen from FIG. 9, an arrangement of combinational logic for decoding the binary-coded decimal digits U1–H2, received from the ING and ED memory into appropriate signals for processing by the remainder of the system. Included in the decoder 91, are digits present gates 924, 937 and 939. These gates detect the presence of any change from the cleared condition of the contents of the ED memory and supply outputs over leads $\overline{UP}$, $\overline{TP}$ and $\overline{HP}$ to gate 967. Gate 967 will deliver an output through gate 969 over lead $\overline{EDPRES}$ to the common control to indicate that received called digits are present in memory.

When the $\overline{DRL}$ signal is received at the input to gate 903, which inverts the signal to an output DRL gates 965 and 966 will detect that the dialed digit is the first digit dialed. Namely, since the tens and hundreds storage positions of the ED memory have been cleared and since only the units position thereof has been incremented by the incrementor 71 within the units selector 24, shown in FIGS. 2A and 2B, and in detail in FIG. 7, only gates 915–921 at the input of the called number decoder shown in FIG. 9 will have appropriate identifying digit levels supplied thereto. Gate 939 which is coupled to each of gates 915, 917, 919 and 921 will supply an output on line UP indicating that there has been received at least one digit corresponding to the units position and will couple the same to one of the inputs of gate 965. The other inputs of gate 965 corresponding to the hundreds and tens positions are also a 1, since these positions within memory are still cleared. The final input is the DRL signal which thereby enables gate 965 through gate 966 to supply a signal over output line FDD indicating that the digit received is the "first" dialed digit. The FDD output is supplied to the units digit selector 24b, shown in FIG. 2B and to gate 326 shown in FIG. 3A. Gate 326 is coupled to a trunk group code selector, the function and operation of which will be described hereinafter.

The FDD signal supplied from the called number decoder is coupled to the inputs of gates 714, 717, 718 and 719, within the units digits selector shown in FIG. 7. The purpose of the FDD signal is to enable the decoder to decode the first digit. This signal clears the output unless a translation is required.

Referring now to the digit assignment index shown in Table I, the following description will relate to the operation of the system in accordance with what particular digit has been dialed as the first digit.

FIRST-DIGIT = 1

Where the first digit is a 1, only the binary $2^0$ position U1 of the ED memory will have stored a 1. The U2, U4 and U8 positions will be cleared, or 0, so that gates 729, 730 and 731 will supply a 1 at their outputs. These outputs are coupled to inputs of gate 773 which also receives the first digit dialed signal FDD. As a result, gates 773 and 774 supply an output FD1 indicating that the first digit dialed is the digit 1. The FD1 output of the units digits selector 24 is coupled through gates 213, 216 and 212 to the line $\overline{\text{LDGT}}$ which is coupled to the common control, indicating the existence of a last digit dialed. The digit decoder 2 now supplies a clear signal through gates 408 and 409 to the $\overline{\text{CLU}}$ input of the units digit selector, to gate 715 and through gate 716, to clear gates 749–772 and, as a result, clear the units digit storage in the ED memory. When the common control receives the $\overline{\text{LDGT}}$ signal and the ING memory is cleared, the status of the call reverts to status 1, so that the calling party again receives dial tone and can proceed with dialing. In other words, whenever the digit 1 is dialed as the first digit, it is repeatedly absorbed, as indicated in table I. The status register will again provide an output indicating that the status of the call has returned to the off-hook status 1 condition.

FIRST DIGIT DIALED = 2

Where the first dialed digit is a 2, the system recognizes that one of the station numbers assigned to the 100 line group 2XX is being called. The first digit decoder 31, shown in FIG. 3A, decodes the digits supplied over lines U1–U8 and supplies decimal outputs over lines 2–9. The 0 and 1 outputs are not employed by the first digit decoder; if the first digit is 1 it is repeatedly absorbed as described above, and if the digit 0 is dialed, the attendant is accessed, as will be described subsequently.

Where the first digit decoder 31 decodes the digit 2, an output is supplied over the lead 2 identified by $\overline{\text{H}} \rightarrow 1\text{A}$ as one of the inputs to the tens and hundreds digit selector 20A, shown in detail in FIG. 8. This input over line $\overline{\text{H}} \rightarrow 1\text{A}$ to gate 805 and gate 806 causes an output to be supplied from gate 845 over line DDH1 to the ED memory, to store a 1 in the hundreds storage position in the ING and ED memory. When the hundreds position of the ED memory stores a 1, the units digit selector is again cleared so that the contents of the ING and ED memory are now 100. As the next digit is dialed, the units position of the ED memory is again incremented, as it is for each dialed digit. Since the contents of the ED memory include a 1 or a 2 in the hundreds position, gates 924–927 in the called number decoder 91 of the called number decoder 22, shown in FIG. 2A, decode that the number being called is a PBX line number and supplies an output over the output $\overline{\text{LINE}}$ to a common control. The called number decoder 91, shown in FIG. 9, also couples signals to the input of gate 964. The hundreds position of the ED memory contains a 1, there is no information in the tens position, and the DRL signal couples a $\overline{\text{T}} \rightarrow \overline{\text{U}}$ output from gate 964 to the input of gate 802 of the tens digit selector 81, shown in FIG. 8. The contents of the units storage position of the ED memory are coupled over lines U1–U8 to gates 821, 826, 830 and 835, respectively, within the tens digit selector 81. The shift signal $\overline{\text{T}} \rightarrow \overline{\text{U}}$ indicates that the contents of the units position are to be shifted into the tens position and, accordingly, output lines DDT1–DDT8 supply signals to the ED memory indicating the shift of the contents of the units digits thereto. The units digits of the ED memory are again cleared as gates 754, 760, 763 and 769 are again cleared by the $\overline{\text{CLU}}$ signal applied thereto, as shown in FIG. 7. The ED memory now contains a 1 in the hundreds position and the second dialed digit indication in the tens position. As the subscriber or attendant next dials or keys the third and final digit, it is stored in the ED memory so that a complete set of digits corresponding to the desired subscriber number is contained therein and can be acted upon by the common control. At the beginning of the 200 millisecond pause which causes the $\overline{\text{DRL}}$ signal to be generated in the digit decoder 2, upon the completion of the dialing of the third digit, the ING and ED memory will contain information in the hundred position, the tens position, and the units position, so that gate 957, shown in FIG. 9, will be enabled to couple a signal through gates 959 and 961, to supply a last-digit-dialed signal $\overline{\text{LDGT}}$ to the common control and the call will be processed on the basis of the information now contained within the ING and ED memory. Thus, when the digit decoder receives 2 as the first digit, the hundreds position of the ED memory is stored with a 1 automatically and the next two digits are shifted into the tens and units positions respectively to identify the calling line. The dialing of the number 2XX permits access to 100 lines within the system.

DIALED DIGIT = 3

When the first digit dialed is the number 3, two course of action are available to the system. On the one hand, an additional 20 PBX lines identified by the numbers 32X and 33X are available. Also, a dial call pick-up code 31 is recognizable.

Considering now the first instance when one of the 120 lines of the system is being dialed, as the ED memory stores the units digit 3, and the contents of the same are incremented by the incrementor 71, as shown in FIG. 7 and described previously, the outputs of gates 301 and 302, shown in FIG. 3A, will each be a 1 so that the units digit B-D decoder 31 will supply an output on the line 3 indicated by the designation $\overline{H \rightarrow 2A}$. This line is coupled to the tens and hundreds digit selector 20A, shown in detail in FIG. 8, which causes the 2 to be stored in the hundreds position of the ED memory. Namely, the $\overline{H \rightarrow 2A}$ input to gate 807 is coupled through gate 808, so that the output of gate 843 is a 1, and the hundreds digit selector 82 supplies a 1 to the two-bit position of the hundreds storage in the ED memory. The units digits are again cleared so that the contents of the ED memory is now 200 or, in binary coded decimal form, 10–0000–0000. For a local line number, the next number dialed will be either the number 2 or the number 3. As the digits are received, since there is information in the hundreds position of the ED memory, gate 964 will again supply an output causing the units information to be shifted into the tens position of the ED memory in accordance with the same process described previously for the dialed number 2XX. The units position is again cleared so that the contents of the ED memory will be 230 or 220, represented by binary coded bits 10–0011–0000 or 10–0010–00001. Gates 924–927 again detect that a 2 or a 1 is stored in the hundreds position of the ED memory and supply an output indicating that a line number has been dialed. The next dialed digit will be supplied to the units position, of course, so that the contents of the ED memory will now contain the complete dialed number 23X or 22X. Gates 924, 937, and 939 within the called number decoder 91 will now provide outputs indicating that each of the storage positions of the ED memory contains information, so that an output will be provided over line $\overline{LDGT}$ to be supplied to the common control indicating that the last digit of the number has been received and the call can be processed.

The alternative situation where the first digit dialed is the number 3 is the above described call pick-up code condition. When the number 31 is dialed, the dialing of the first digit 3 again causes a 2 to be stored in the ED memory. The next dialed digit will be the number 1 to complete the dialing of the number 31. When this happens, gates 929 and 928 supply an output indicating that the storage contents of the ED memory in the hundreds position is a 2, as one of the inputs to gate 962. The tens position is still cleared and the units position contains a 1. The DRL signal causes gate 962 to supply an output over line $\overline{CPCODE}$ indicating a call pick-up code condition. This indication is distributed to the common control over the $\overline{CPCODE}$ line as shown in FIG. 2A.

FIRST-DIALED DIGIT = 4

As is indicated in the above Table I, when the first dialed digit is a 4, the system will anticipate that a two- or a three-digit trunk access code is being dialed. If it is not, the system will intercept the call to busy tone.

Once the first digit has been received, and is stored in the units position of the ED memory, the units digit B-D decoder 31 will decode the same in decimal format. As a result, an output will be supplied over line $\overline{H \rightarrow 3}$ to the tens and hundreds digit selector 20A, shown in FIG. 2A. If a two digit access code (corresponding to the number 4X) is employed, the J wiring shown in FIG. 3A will be strapped. This strapping supplies a signal over line $\overline{T \rightarrow 3}$ to the tens and hundreds digit selector 20A, shown in FIG. 2A. At the same time, an output is supplied over lead $\overline{H \rightarrow 3}$ to the tens and hundreds digit selector 20A. These signals are coupled to the respective tens digit selector 81 and hundreds digit selector 82 shown in FIG. 8, so that the ED memory will be supplied with outputs over lines DDH2, DDH1 and DDT2 DDT1 to store the number 330 represented by the binary coded decimal digits 11–0011–0000 in the ED memory. The units digit is cleared from the units digit selector outputs and the ED memory, again. When the next digit is dialed, the X digit in the number 4X, the called number decoder 91, shown in FIG. 9, will supply appropriate signals to gate 950, the inputs of which correspond to the fact that the hundreds position of the ED memory is a 3, the tens position is either a 3 or a 4 (in this case it is a 3), there is a number in the units position and the completion of the dialing of the second digit has taken place, represented by signal DRL. This signal will be coupled to gates 951–952–954 and gates 956, 958 and 960 to inform the common control that a trunk access code has been dialed, so that appropriate action can be taken.

Gate 954 supplies a signal over line AJ to gate 211, for requesting the allotment of a junctor. Gate 211 couples the junctor request over lead $\overline{GEC}$ to junctor group decoders 41 and 42 within the digit decoder 2, shown in FIG. 4A. Depending upon the appropriate strapping and permitted class of service an allotter form a designated junctor group will be selected. Gate 419, shown in FIG. 4B, which is enabled upon the strapping and the decoding by the junctor group decoder, couples its $\overline{A}$ output through gate 203 in digit decoder 1, to the ED number decoder 22 and gate 210 to provide a JGE lead signal to a junctor allotter. The $\overline{A}$ input to gate 956 and the output of gate 951 to gate 956 supply the trunk access $\overline{TRKACC}$ signal to the common control.

Instead of dialing a two digit trunk access code 4X, a three digit code 43X and 44X may be dialed. In this instance, the J wiring between strapping point FD4 and 2DG shown in FIG. 3 is not connected. As a result, the tens position of the ED memory is not forced to a 3 by the tens and hundreds digit selector 20A. Instead, the memory initially stores a 3. When the second digit is received, corresponding to a 3 or a 4, it will again be shifted to the tens position in the same manner as described previously with a call to one of the 120 available lines in the system. The contents of the ED memory will now be 330 or 340, the units position having been cleared. When the third digit is dialed, the called number decoder 91 within the ED number decoder shown in FIG. 9 will again cause gate 950 to provide an output signal indicating that a trunk access code has been dialed.

If the three digit dialed number does not correspond to the proper 3 digit trunk access code 44X or 43X, gate 955 within the ED number decoder 22, shown in FIG. 9, will provide an output indicating that the dialed number does not correspond to a correct trunk access code. In other words, the output will indicate that a wrong trunk access code identified by signal $\overline{WTAC}$ has been dialed. This signal is coupled to gate 331 shown in FIG. 3B and then through gate 207 to line S10–S11 shown in FIG. 2B to the status encoder, indicating that busy tone, corresponding to status 11, is to be returned to the calling party.

When it is desired not to use the digit 4 for a two or three trunk access code, it may be directly strapped to provide busy tone. In this instance, the "four" output of the units digit B-D decoder 31, shown in FIG. 3A, is strapped to one of the inputs of gate 331 so that, if a 4 is initially dialed, the calling party will receive busy tone.

FIRST DIALED DIGIT = 5

The first digit 5 is employed for a single digit trunk access code, for a universal night answer code or for intercept to busy tone. In the latter instance, the No. 5 output of the units digits B-D decoder 31 will be strapped to the B5 connection to the input of gate 331, to supply busy tone to the subscriber, as described previously. For the single digit trunk access code the No. 5 output of the decoder 31 will be strapped to one of the terminals TG5-TG9 at the inputs of gate 319, 320 and 325, within the single digit group decoder 33, shown in FIG. 3A, for access to a trunk group. Depending upon the strapping, the trunk group selector 32 will then decode the output lead of the appropriate gate and supply the necessary BCD signals over lines GE1—GE8 to the digit decoder 2. These leads are strapped to the junctor group decoder 41 for selective strapping to associated trunk groups for the trunk class of service. The call will be blocked or enabled, depending upon the strapping selected in the class of service buffer within the common control. One of the terminals 1–25 will be connected to one of the Y-EE terminals for appropriate strapping to the gates 410–416 which are also connected to the class of service buffer for the appropriate trunk groups. Connections are also available for the leads A–X through gates 403–407 for supplying appropriate strapping indication signals to the common control. The other output terminals JGL–TG440 are supplied to the junctor allotter. Gates 403–407 supply dial pulsing information which must out-pulse only dial pulses. The output of gate 419 is also supplied as one of the inputs to gate 203, shown in FIG. 2A, which is coupled to the called number decoder 22. This lead is for a calling line class of service restriction to trunk groups. Within the ED number decoder 22, the output from gate 419 within the digit decoder 2 is coupled to the gate 956 which supplies a trunk access code signal. A low on the output of gate 419 within the digit decoder 2 indicates that the junctor group should be denied to the calling line. An appropriate signal will be supplied to the common control to this effect.

For the universal night answer code, the 5–8 outputs of the units digit B-D decoder 31 may be selectively strapped by way of the G wiring to the UNA (universal night answer) input of gate 323. The output of gate 323 is coupled as an input to gate 329 which then supplies a signal to the status encoder over output lead $\overline{S06-08}$ corresponding to a night service status change. Gate 323 is also coupled to gate 324, gate 330 and gate 332 to supply a signal to clear the ED memory to all zeroes over line $\overline{CLED}$ which is coupled to the tens and hundreds digit selector 20A-20B, the unit selector 24A-24B and the called number decoder 22.

FIRST DIALED DIGIT = 6

The operation and connections of the digit decoder when the first dialed digit is a 6 is the same as that for when the digit is a 5, except that the strapping is between the No. 6 output of the decoder 31 and the appropriate gates, in place of the No. 5 output.

FIRST DIALED DIGIT = 7

As is shown in Table I, in addition to single digit trunk access code, universal night answer code and intercepted busy tone features, this dial digit has a code-call access code feature. Again appropriate strapping to the number 7 output of decoder 31 and associated gates is provided.

FIRST DIALED DIGIT = 8

When the first dialed digit = 8, in addition to the single digit trunk access code, universal night answer code and intercepted busy tone features, which are carried out in the same manner discussed above in connection with digits 5, 6 and 7, the system is equipped to intercept the call to an attendant. This is achieved by the strapping K wiring between the 8th terminal of the decoder 31 and strapping point TG8, at the input of gates 313 and 314. From the class of service buffer, inputs are supplied to gate 201, shown in FIG. 2A, corresponding to an operator or station assigned as an operator class of service. The output of gate 201 is coupled to gate 311, the output of which is connected to gate 327. The output of gate 327 is connected to the timer to provide an operator detected signal. The other input of gate 314 may be connected by way of the A wiring to ground for attendant routing. Gate 314 is coupled through gate 316 to indicate a request for an attendant. Gate 316 is also coupled through gate 327 to the timer. Gate 316 is also coupled through the gate 321 to couple a signal over the line $\overline{ATT}$ to the tens and hundreds digit selector 20A and to the called number decoder to supply a signal for a request for translation to the attendant's line number. This signal is coupled through gates 901 and 902 and then through gates 959, 961 and 963 to indicate to the common control that the last digit necessary for identifying the attendant has been received and that it is the attendant's line to which the call is being directed.

Where the resistor-battery connection with the input of gate 314, in place of being strapped to ground for attendant routing, is connected to the terminal NT, as an input to gates 340, 329 and 312, these gates will be equipped for effecting night answering features. Otherwise, the call will be directed to the attendant during the day. The output of gate 340 is connected either to the night answering line $\overline{NA}$ by way of the strap F wiring or to the inputs to gates 328 and 330 by way of the G wiring. For predetermined night answering, the other input of gate 312 is grounded while the output of gate 340 is connected to line $\overline{NA}$.

DIALED DIGIT = 9

When the first dialed digit = 9, either a single digit trunk access code or intercept to busy tone features will be carried out in the same manner described above in connection with digits 5–8, except that it is the No. 9 out of the decoder 31 which is appropriately strapped.

DIALED DIGIT = 0

When the first dialed or keyed digit = 0, the ED memory will have a 1 stored in the 2 and 8 positions. Upon receipt of the first digit dialed signal FDD, gate 717 will supply an output indicating that the digit is a 0 over line $\overline{FD0}$ which is coupled to the input of gate 315, shown in FIG. 3B. This will provide a request for an attendant by way of 316 and the appropriate subsequent gates, in the same manner described previously.

The digit decoder is also equipped with a feature whereby if a digit containing more than 10 impulses is received, the resulting code will be limited to a value of 10 to prevent simulation of codes which might otherwise interfere with certain features of the system. This is effected by the logic circuitry of the units digits selector shown in FIG. 7, which prevents any action from being taken in the event that more than 10 impulses are received.

In addition to the above basic features of the analysis of the digits dialed within the PBX system itself, which analysis is carried out essentially within the confines of the digit decoder 1 portion of the digit decoder, the present invention is also equipped with circuitry for detection that an inward DID call has presented a listed directory number. The ED memory storage is employed for this purpose.

For direct inward dialing operation, either three digit or four digit capabilities are provided. The thousands and hundreds digits are strappable and can be any digit from 1 through 0. The tens and units digits are used as received to define the station equipment number; no translation is provided. Two hundreds digits can be selected for coverage of all 120 lines. In addition to the digit value strapping, a strap is employed to select either 3-digit or 4-digit DID operation.

Referring now to FIGS. 6 and 7, which show the portion of the digit decoder 2 handling DID/LDN calls, from the class of service buffer and the timer, signals indicating the existence of a DID trunk and an input call, respectively, will be supplied to NAND gate 603. For a dialing condition, gates 603 and 604 will supply enabling signals to gate 606, which provides an output over line $\overline{DRT}$ to indicate that an inward dialing trunk has presented a complete digit for analysis. The generation of the signal $\overline{DRT}$ is similar to the generation of the signal $\overline{DRL}$ where a local line has presented a complete digit for analysis.

As the first digit is impulsed from the central office and stored in the ED memory, the units position of the ED memory will be incremented, as described previously in connection with the digit decoder 1, where the units storage position of the ED memory has its contents continuously incremented by each digit pulse.

As is shown in FIG. 5A, the contents of the ING and ED memory are provided over lines U1–U8 to the inputs of a called number units digit decoder-comparator 54, which compares the digits on lines U1–U8 with the respective BCD digit signals provided by the digit selectors 51 and 52. Digit selectors 51 and 52 are selectively strappable at terminals A1–T1 to either a battery terminal PU or a ground terminal GN. The designations to the left of the terminals A1–T1 in FIG. 5A indicate the values which will be assigned to that respective terminal when it is strapped for either a 4 digit DID number, a 3 digit LDN number, or a 4-digit LDN number. In addition to the terminal inputs A1–T1 which are connected to inputs A0–A3, B0–B3 on digit selector 51 and inputs A0–A3 and B0–B3 on digit selector 52, terminals S1–SB are employed for activating the steering of the inputs to output lines O0–O3 to the inputs A0–A3, respectively, of called number units digit decoder comparator 54. Decoder-comparator 54 is, in effect, a comparator which compares its inputs A0–A3 with the contents of the units position of the ED memory U1–U8. The operation and effect of this comparison will be discussed hereinafter.

The U1–U8 bits from the ED memory are also coupled to inputs A, B, C, and D, respectively of the called number units digit decoder 53. Decoder 53 effects a BCD-decimal conversion of the inputs from the units position of the ED memory and supplies the decimal representations thereof on outputs 0–10. Lines 1–10 are strapped to terminals U1–U10. The zero output is employed for recognizing the presence of information in the units position of the ED memory and is connected as one of the inputs of gate 504.

Terminals HA and HB are employed for strapping the hundreds position of the DID number and are connected to the inputs of gates 505 and 506. While any number may be selectively strapped, for the purposes of the following explanation in keeping with the numerical designations employed previously, for the 120 lines within the system, the U2 terminal will be assumed to be strapped to the HA terminal and U3 terminal will be strapped to the HB terminal. Thus, for an inward call, the lines 2XX, 32X and 33X will be accessable for direct inward dialing.

DIRECT INWARD DIALED (DID) CALL-THREE DIGITS

Initially, let it be assumed that the thousands digit is not employed and the direct inward dialed number is a 3 digit number. Upon receiving the first impulse digit from the central office, gate 606, shown in FIG. 6, referred to previously, will provide a $\overline{DRT}$ output which is coupled to the inputs of gate 503 and gate 504. For a simple direct-inward-dialed call, we will assume that the calling party is attempting to reach one of the numbers 2XX or 32X or 33X. Within this group, for simplification, let it be assumed that the calling party has dialed the subscriber associated with the number 234. It will also be assumed that the number 234 is not a listed directory number (LDN).

When the first digit number (2) has been impulsed and stored in the ED memory, the contents of lines U1–U8 will be 0100, respectively. The called number units digit decoder 53 will decode this BCD number and provide an output on terminal U2 and also on the EDUP line. By virtue of inverter gate 503, the $\overline{DRT}$ signal will be coupled through the AND gate 504, to cause the decoder-comparator 54 to compare the information on inputs A0–A3 with that supplied from the units position of the ED memory at inputs B0–B3. At the same time, gate 501 couples the two hundreds bits within the ED memory through OR gate 501 to the inverting trigger inputs SA and SB of each of digit selectors 51 and 52. Since the only information stored within the ED memory at the present time is that of the first dialed digit, no other action having been taken, the contents of both bits of the hundreds position are zero, so that by virtue of the inverting inputs SA and SB, each of the digit selectors 51 and 52 is triggered, to compare the listed directory strapped number with the contents of the units lines U1–U8 from the ED memory. As indicated previously, since the number 234, which we have made our test number, is not the listed directory number, no positive comparison will be effected by called number units digits decoder-comparator 54.

In addition to supplying the hundreds bit lines to gate 501 and the units bit lines to the called number digits decoders 53 and 54, the ED memory supplies the information from the tens storage position to the tens digit decoder 61, shown in FIG. 6. Furthermore, the lowest two significant bits of the four bit tens information, bits T1 and T2, are supplied to the inputs S1 and S2 of the digit selectors 51 and 52. As will be seen subsequently, these bits are also used for triggering the gating of the strapped listed directory number bits at the input terminals A1–T1 to the outputs 00–03 of the digit selectors 51 and 52.

The tens digit decoder 61 converts the BCD inputs T1 to T8 from the tens position of the ED memory into an 8's - complement decimal output by way of the inverting outputs. For purposes of the facility of operation of the system, only the inverted 2 and the inverted 4 through 8 outputs have been employed, corresponding to the $\overline{10}$ and $\overline{12\text{-}15}$ and $\overline{0}$ outputs.

Since the first received digit stored in the ED memory is in the units position, the contents of the tens position are empty so that the output EDTP corresponding to a tens present in the ED memory is a 0. Since the output of gate 501 and the line EDP are both 0, NAND gate 502 supplies an output indicative of the receipt of the "first digit" to gate 511. Furthermore, its output is also connected to the other inputs of gates 505 and 506 by virtue of the DID wiring for a 3 digit DID number. As was previously indicated, since the direct inward dialed number under consideration is the number 234, there will be an output on terminal U2 which is coupled to terminal HA and from there to gate 505. If the direct inward dial number had 3 as the first digit, terminal U3 would supply a signal to terminal HB by virtue of the strapping therebetween which would be coupled to the input of gate 506. The DRT signal, in addition to causing the decoder-comparator 54 to compare the contents of the units storage of the ED memory with the strapped LD number steered by the digit selector, also activates gates 508 and 507. In this instance, since the first number is a 2, gate 508 is enabled. Gate 508 is coupled to digit decoder 1 over line $\overline{H \rightarrow 1}$ to cause a 1 to be placed in the hundreds storage position in the ED memory by virtue of the operation of the tens and hundreds digit selector 20A shown in FIG. 2A and in detail in FIG. 8, described previously. Of course, if the first dialed digit were the number 3, for a direct inward dialed call 32X or 33X, the hundreds position of the ED memory would have a 2 placed therein by virtue of an output from gate 507 over the line $\overline{H \rightarrow 2}$. In either instance, gate 512 couples an output to gate 522 and gate 523 to cause the digit decoder 1 to set a 14 in the tens position of the ED memory over line $\overline{T \rightarrow 14}$. Then, a clear signal $\overline{CLEDU}$ is directed over line CLEDU from gate 525 to gates 408–409 shown in FIG. 4A, to the digit decoder 1, to clear the units position of the ED memory, now that the first digit has been processed.

As will be appreciated from the above description and the description to follow, by virtue of the complementary conversion effected by the tens digit decoder 61 associated with the tens bit position in the ED memory, the present system is able to reduce the amount of storage necessary for all the processing of the digits, whether they be outgoing or incoming digits, as are necessary for whatever type of determination is needed before the call is further processed by the common control. Only two BCD bits are provided in the hundreds position of the ED memory and the units position is used continuously to receive the bits as they are dialed and analyzed. The tens bit position has four BCD bits available which provide a total of five extra valves (11–15) for control purposes. For the purposes of an orderly understandable sequence of events, the numbers 13, 14, 15, which always use both of the upper two significant bits of the BCD four bit combination 8–4–2–1, are employed. The advantages of the choice of these bits will become more apparent in the description of the system to follow.

With the first digit from the central office having been processed, the contents of the ED memory, for the direct inward dialed number 234 under consideration, is now 1–14–0 or 01–1110–0000. Upon receiving the second digit (the digit 3) of the direct inward dialed number 234, the units position of the ED memory is incremented to store the number 0011. The contents of the ED memory now read 01–1110–0011. Since there is information in the hundreds position of the ED memory, the input on line H2 to gate 501 will be inverted at the inputs SA and SB of the digit selectors 51 and 52, so that the digit selectors will not be triggered by the gate 501. However, the tens position of the ED memory contains a 1 in the bit position T2 which will cause steering of the inputs on lines A1–T1 to the outputs 00–03 to the decoder-comparator 54. Since there is information in the units position of the ED memory, gate 504, upon receipt of the signal $\overline{DRT}$ through gate 503, will cause the comparator 54 to compare the inputs A0–A3 with the units contents B0–B3. Since the listed directory number is assumed not to be the number 234 there is no output at A=B supplied to gate 517. Similarly, gate 502 is now disabled by virtue of gate 501, so that the first digit analysis, which has already taken place, is no longer carried out by gates 505–506–507, etc. During the analysis of the second digit, however, since the contents of the tens position of the ED memory have been set to be equal to the number 14, there is a signal supplied over line $\overline{T = 14}$ through gate 513 as one of the inputs to gate 528. The other inputs of gate 528 are supplied from an inverter 519 from the output of the comparator 54, from gate 504 and from gate 501, so that the gate 528 will provide an output over line $\overline{T \rightarrow U}$ to the tens and hundreds digit selector 20A shown in FIG. 2 of the digit decoder 1, and shown in detail in FIG. 8, to cause the contents of the units storage position of the ED memory on lines U1–U8 to be placed in the tens position of the ED memory. As a result, the second digit 3 or, in BCD form, 0011 is now placed in the tens position of the memory and then, of course, the units digits are cleared so that the contents of the memory now read 01–00–11–0000.

When the next or third digit (the digit 4) is received, a similar LDN comparison takes place as described previously which, of course, will be negative. Gate 502 and the subsequent gates are again disabled since there is information in the hundreds position and the system is concerned at this point with only the contents of the units position which contains the third dialed digit. The ING and ED memory supplies a signal over line T< 12 indicating that the contents of the tens position is less than 12 (T = 3 since the contents of the units position were transferred to the tens position of the ED memory in the previous action) to supply an input to gate 527. The other inputs are received from line EDTP from the tens digit decoder 61, shown in FIG. 6, since there is information in the tens position and from gate 504. Since the contents of the tens position is less than 12, accordingly, gate 527 provides an output to the digit decoder 1 and then to the common control over line LDGT indicating that the last digit has been received. The common control can now continue processing the call since the total number of digits necessary for the direct inward dial call for number 234 have been stored in the ED memory.

FOUR DIGIT DID NUMBER

In the above described process of the manner in which the system processes a direct inward dialed number, it was assumed that the number of digits in the direct inward dialed number totaled 3 (corresponding to the number of digits in the number 234, taken as the example). In accordance with the present invention, however, up to four digits are available for processing a direct inward dialed number. In this instance, the input terminals A1, E1, K1 and P1 of the digit selectors 51 and 52 are selectively strapped to the PU and GN battery and ground terminals. Moreover, in place of connecting the output of gate 502 to the inputs of gates 505 and 506, the line $\overline{T \rightarrow 13}$ is connected to the inputs of gates 505 and 506. As a representative example, let it be assumed that the direct inward dialed number contains the same hundreds, tens and units digits as the above described example 234. In addition to these three digits, let the first digit be the number 6, so that the four digit direct inward dialed number will be the number 6234. As a result, the E1 and K1 inputs of the digit selectors 51 and 52, respectively, will be strapped to the terminals PU, while the A1 and P1 terminals will be strapped to the ground terminal GN. It will again be assumed that the number 6234 is not a listed directory number. As the first digit is impulsed and stored in the units position of the ED memory, it is decoded by decoder 53 and the comparison by decoder-comparator 54 takes place. In this instance, since the contents of the units position U1-U8 supplied to the decoder-comparator 54 on inputs B0-B3 represent the thousands digit which has been strapped at the A1, E1, K1 and P1 inputs of the digit selectors 51 and 52, decoder 54 will provide a positive comparison that the digits A0-A3 equal the digits B0-B3 and provide an enabling signal over output A = B. Since the tens position in the ED memory is still empty, it will necessarily be less than 12 so that an input signal over line T < 12 from the ING and ED memory supplied to one of the inputs of gates $\overline{526}$ will enable the gate 526 to supply an output $\overline{T \rightarrow 13}$. This signal is supplied to the tens and hundreds digit selector 20A shown in FIG. 2A, of the digit decoder 1, the details of the tens and hundreds digit selector being shown in FIG. 8. As a result, the number 13 is set in the tens position of the ED memory. From the standpoint of the operation of the listed directory number comparison features of the system, from the standpoint of the first digit (here the digit 6), the system operates as though the dialed number is a listed directory number. This is due to the fact that the strapping inputs to the digit selectors 51 and 52 is employed for handling the thousands digit. The units bits are now cleared and upon receiving the second digit (corresponding to the hundreds bit position) a further $\overline{DRT}$ signal is received. The second received digit is the number 2, as it was in the case of the direct inward dialed number 234, so that the same operation described previously proceeds except for the fact that in place of the first digit signal supplied from gate 502, the first digit signal is effectively provided on line $\overline{T-13}$ from the tens digit decoder which received a 13 by virtue of the fact that a four digit DID number was involved. The processing of the call, at this point, takes place in exactly the same fashion described above and, upon completion of storage of each of the dialed digits 6-2-3-4, an LDGT signal is supplied to the common control for processing of the call.

In the event that, in either of the above two situations, for either a four digit or a three digit direct inward dialed number, the wrong number was dialed, an output is provided by way of gate 529 to the common control so that busy tone will be returned. For a three digit number, if the first dialed digit is not the digit strapped to terminals HA or HB then the appropriate gate 505 or 506 will not be enabled, so that one of the gates 508 or 507 will not be coupled through gate 512 to enable gate 514 and gate 520 as an input to gate 529. Similarly, where the thousands digit is incorrectly dialed, for example if the thousands digit of the direct inward number had been strapped as a six, as in the example above, but the first dialed digit was a five, then the output comparison for the thousands digit by decoder-comparator 54 would be inverted by way of gate 519 to cause gate 529 to supply a wrong number indication to the common control.

DID NUMBER = LDN NUMBER

The above examples have dealt with the case when the incoming call did not correspond to a listed directory number. The following description deals with the case where the incoming call corresponds exactly to a listed directory number. The manner in which the call is processed on an individual digit by digit basis is the same as described previously, except for the fact that a listed directory number comparison is made for each digit as it is processed.

For the case of a four digit listed directory number, each of the terminals A1-T1 will be strapped to either a battery or ground terminal for the purposes of identifying each respective thousands, hundreds, tens and units digit.

Upon receipt of the first complete digit, the $\overline{DRT}$ signal as usual, will be coupled through gate 503 to gate 504. Assuming that the correct number has been dialed, digit selectors 51 and 52 will supply the same BCD bit indications on inputs A0-A3 as are the BCD bits supplied to the inputs B0-B3 of the called number units digit decoder-comparator 54. As a result, for the thousands bit, comparator 54 will supply an enabling output to the gates connected thereto. For a listed directory number falling within the set defined by a direct inward dialed number, the three or four digit strapping for the direct inward dialed number is employed. Thus, for the four digit listed directory number, the line T=13 will be connected to the inputs of gates 505 and 506. As a result of a positive comparison in decoder-comparator 54 for the thousands bit, gate 526 will be enabled in the same manner discussed above for a four digit direct inward dialed number so that the digit decoder 1 will place a 13 in the tens position of the ED memory. The units position of the ED memory is then cleared and the second received digit is processed. Again, a positive comparison of the contents of lines U1-U8 and terminals E1-F1-L1 and R1 through the digit selectors 51 and 52 to the decoder-comparator 54 takes place. One of the gates 505 and 506 (here we are assuming that the second digit is the number 2 again so that the gate 505 will be enabled) will be enabled and coupled through one of the gates 508 and 507 to set either a 1 or a 2 (here a 1) in the hundreds position of the tens and hundreds digit selector within the digit decoder 1, as described previously. Since the contents of the tens position is not less than 12, since it was set at 13 during the processing of the first or thousands digit, gate 526 is not enabled so that a 13 is not set in the tens position. Instead, gate 521 is enabled in the same manner described previously with a direct inward dialing call to set a 14 in the tens position of the ED memory. The units position is again cleared so that after receiving the first two digits, the contents of the ED memory is 00–1110–0000.

When the third digit is received, corresponding to the tens position of the incoming number, a positive comparison is again provided by the comparator 54. For a four digit LDN number, the output of gate 518 is strapped to the line $\overline{T \rightarrow 15}$. The positive comparison from the output of gate 54 and the fact that the contents of the tens position of the ED memory T = 14 enable gate 518 so that the contents of the tens position of the ED memory receives the number 15. The units bits are again cleared so that after receipt of the first three digits, the contents of the ED memory are 00–11–11–0000.

Finally, upon receipt of the final or fourth digit in the four digit listed directory number, the decoder 54 provides a positive comparison, again. Since the contents of the tens position of the ED memory T = 15, gate 517 is enabled so that a listed directory number $\overline{LDN}$ signal is applied to the digit decoder 1. This provides an indication to the digit decoder 1 that the last LDN digit has been received so that the call will be appropriately processed.

Of course, if the incoming number does not correspond to the strapped listed directory number, at the point where the number departs from the strapped digit, the called number units digit decoder-comparator 54 will not provide a positive comparison output, so that by way of gate 519, gate 529 will supply an output to the common control indicating that a wrong number has been dialed.

For a three digit listed directory number, the processing takes place in exactly the same manner as described above, except that the signal processing for the first digit is obviated.

As a further feature of the listed directory number processing aspects of the present invention, if the listed directory number hundreds digit is the same as a two or a three DID hundreds digit, no special digit selection strapping for the listed directory number is required. In this case, the number that must be received must have the tens and units digit of the 0—0. Thus, the LDN number must be the number WX00- or X00, where W is the DID thousands digit and X is either the two or the three DID hundreds digit. For this case, a strap is employed to allow the translation of the received number into the attendant equipment number.

More specifically, the outputs of the called number units digit decoder 53 $\overline{U=1}$ and $\overline{U=10}$ are coupled to the circuitry shown in FIG. 6. Moreover, the $\overline{T=10}$ output of the tens digit decoder 61 is coupled through the gate 516 as another input of gate 524. As a result, when one of the above referred to listed directory numbers, the units and tens digits of which = 0, is received, gate 524 supplies an output through the strap to the line LDN which is coupled to the digit decoder 1.

Of course, in place of supplying busy tone, upon receipt of a wrong number signal, strapping provided on the digit decoder 1, shown in FIGS. 3A and 3B, permits the wrong number signal to be appropriately gated to other system features, such as the attendant through gates 316 and 321 by way of a signal $\overline{ATT}$ or to an intercept recorder by way of signal $\overline{IR}$.

OUTWARD TOOL RESTRICTION ANALYSIS

The digit decoder 2 portion of the present invention is also capable of carrying out digit analysis for outward toll restriction purposes. The circuitry for accomplishing this is shown in detail in FIG. 6 and consists essentially, of appropriate strapping, depending upon the particular digits governing the restriction or permission of calls. These digits are usually the first digit 0 or the first digit 1, as designated by the terminals FD0 and FD1 at the outputs of gates 620 and 621. For toll restriction purposes, the status circuit will provide an input on line DS 33 + 52 (corresponding to a toll restriction analysis status or a toll restrict dialing status, respectively.) Gate 605 receives signals representative of an interdigital pause and supplies the same to gate 613 which also receives the above described toll restriction status signal from the status decoder. The class of service buffer provides signals to gate 202 and then to gate 204 within the trunk restriction over-ride to attendant circuit 25, shown in FIG. 2A, the output of gate 204 being coupled through gate 205 to provide a direct distance dialing $\overline{DDD}$ signal to gate 612 and gate 613. Upon the existence of a unit bits signal in the ED memory, gate 613 is enabled to supply an input to gate 619. Gate 619 also receives an indication from the tens digit decoder 61 whether or not information is contained in the tens position of the ED memory. Depending upon the appropriate strapping and the numerical values of the digits in the units position, the digits 1 and/or 0, gates 617–625 will supply outputs over the strapped lines connected thereto to set the appropriate values in the ED portion of the memory of the tens and hundreds digit selector 20 A within the digit decoder 1. This permits unallowed calls to be diverted to the attendant and calls to be intercepted as strapped. 628 provides a signal to the common control for toll diversion and toll restriction purposes. Thus, in substantially the same manner that the digit decoder 2 handled incoming calls for direct inward dialing/listed directory number purposes, toll restriction calls are handled by the bit positions greater than 10 in the tens position of the ED memory. This permits a significant reduction in the number of register stages required in that additional counting circuitry is not necessary. The output of gate 623 is connected to the line $\overline{T \rightarrow 12}$ if, on outward toll restriction, a second digit 0 is to be intercepted. Similarly, gate 624 is connected to line $\overline{T \rightarrow 12}$ to intercept a second digit 1. Otherwise, gates 323, 324, 325 are connected to line $\overline{T \rightarrow 15}$ to set the value 15 in the tens position of the ED memory. The output of gate 620 is connected to the line $\overline{T \rightarrow 12}$ if a first digit 0 is to be restricted while it is connected to the line $\overline{T \rightarrow 15}$ (terminal EN) if a first digit 0 is to result in an incremented call. Conversely, terminal FD1 is so connected if the first digit 1 is to be restricted, or to result in a permitted call, respectively.

Terminals FD0 and/or FD1 are connected to the terminal SDA which forces a 13 to be stored in the tens position by way of the digit decoder 1 if a 0 and/or a 1 is to be ignored as a first digit and second digit analysis is employed.

The output of gate 622 is connected to terminal EN if a first digit which is neither a 1 nor a 0 is for allowed call purposes. Otherwise, it is connected to terminal SDA for second digit analysis (SDA) purposes.

Thus, while the use of the higher order tens bits is employed for outward toll analysis, it is initially governed by the output of the status decoder which requires that the status of the call be either toll restriction analysis or toll restrict dialing. Otherwise, the circuitry is disabled so that a distinction can be made between the use of the higher order bits through the tens digit decoder 61 for this type of processing and for listed directory number processing.

From the foregoing detailed description of the invention, it will be appreciated by those skilled in the art that a complete analysis of dialed digits, both from a standpoint of a call originating within the PBX system and from external calls being directed to the system can be effectively provided.

In accordance with the present invention, a significant reduction in the necessary storage for handling both three digit and four digit calls is achieved by both time shared incrementing of the contents of the ED memory and the optimumization of the bits available.

While we have shown an embodiment in accordance with the present invention, it is understood that the same is not limited thereto but is susceptible of numerous changes and modifications as known to a person skilled in the art and We therefore do not wish to be limited to the details shown and described herein but intend to cover all such changes and modifications as are obvious to one of ordinary skill in the art.

We claim:

1. In a common control type private automatic branch exchange telephone system having a memory containing a plurality of storage positions for storing the respective digits identifying a called number in response to dialed number information and a digit decoder for analyzing the contents of said memory and for supplying to the common control circuits of said system signals representative of further action which is necessary for processing the call, the improvement wherein said digit decoder comprises first means, responsive to the reception of a first complete digit in the called number, for storing a prescribed digital code, the value of which is not exclusively established to correspond to the value of said first complete digit, in a first selected one of said plurality of storage positions within said memory;

second means, responsive to the reception of respective subsequent complete digits in the called number, for storing respective digital codes, corresponding to the values of said subsequent complete digits in respective selected ones of said plurality of storage positions within said memory; and third means, responsive to the reception of the last complete digit necessary for identifying the course of action to be taken by the system, for supplying a signal representative thereof to said common control circuits, and wherein the number of said plurality of storage positions within said memory corresponds to the number of digits identifying the line circuits within said system and wherein said decoder includes fourth means for storing each respective consecutively received digit in the same selected storage position as it is received for analysis by the decoder and for subsequently clearing said same selected storage position upon the completion of the processing of each received digit which is followed by a subsequent digit necessary for complete analysis of the called number.

2. The improved digit decoder according to claim 1, wherein said second means includes means for shifting the contents of said same selected storage position into another storage position when the contents of said same selected storage position is the second complete digit in the called number.

3. The improved digit decoder according to claim 2, wherein said digit decoder includes fifth means, responsive to a direct inward dialed call, for converting the contents of said another storage position of said memory to a plurality of respective numerical codes for decoding the respectively received consecutive digits making up the direct inward dialed number.

4. The improved digit decoder according to claim 2, wherein said digit decoder includes means for comparing the respective consecutively received digits of a direct inward dialed number with the respective digits identifying a listed directory number for said system and for generating a signal upon the coincidence of the digits of said direct inward dialed number with said listed directory number.

5. The improved digit decoder according to claim 4, wherein said digit decoder includes fifth means, responsive to a direct inward dialed call, for converting the contents of said another storage position of said memory to a plurality of respective numerical codes for decoding the respectively received consecutive digits making up the direct inward dialed number and for comparing the digits making up a listed directory number with the digits making up said direct inward dialed number.

6. The improved digit decoder according to claim 5, wherein said fifth means further includes means for selectively storing a respective one of said numerical codes into said another storage position of said memory in accordance with the values of the digits consecutively received by said decoder.

7. The improved digit decoder according to claim 3, wherein said fifth means further includes means for selectively storing a respective one of said numerical codes into said another storage position of said memory in accordance with the values of the digits consecutively received by said decoder.

* * * * *